United States Patent
Ikeda et al.

(10) Patent No.: US 6,728,918 B1
(45) Date of Patent: Apr. 27, 2004

(54) RELAY TRANSMISSION METHOD AND SYSTEM, AND DEVICE USED THEREOF

(75) Inventors: Koji Ikeda, Neyagawa (JP); Akio Kurobe, Tondabayashi (JP); Go Kuroda, Izumisano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 507 days.

(21) Appl. No.: 09/699,424

(22) Filed: Oct. 31, 2000

(30) Foreign Application Priority Data

Nov. 1, 1999 (JP) .......................... 11-311441

(51) Int. Cl.[7] ............................................. G08C 25/02
(52) U.S. Cl. ........................................ 714/748; 714/751
(58) Field of Search ........................ 273/349; 455/22; 714/774, 701, 748, 751; 340/905; 395/174; 914/748

(56) References Cited

U.S. PATENT DOCUMENTS

| | | | | |
|---|---|---|---|---|
| 4,346,479 A | * | 8/1982 | Weber ........................ | 455/22 |
| 4,701,923 A | * | 10/1987 | Fukasawa et al. .......... | 714/774 |
| 4,720,829 A | * | 1/1988 | Fukasawa et al. .......... | 714/701 |
| 5,031,179 A | * | 7/1991 | Yoshida et al. ............. | 714/748 |
| 6,130,626 A | * | 10/2000 | Kane et al. .................. | 340/905 |
| 6,151,148 A | * | 11/2000 | Harano ........................ | 359/174 |

FOREIGN PATENT DOCUMENTS

JP 9-181772 7/1997

* cited by examiner

Primary Examiner—David Ton
(74) Attorney, Agent, or Firm—Wenderoth, Lind & Ponack, L.L.P.

(57) ABSTRACT

In a relay transmission method and system, and a device used therefor, efficiently realizing relay transmission on a half-duplex transmission path while controlling retransmission, a transmitter on the transmission side receives a polling from a transmitter on the reception side, and then transmits a frame-numbered data frame to a relay transmitter. If a data frame is not normally received, the transmitter on the reception side generates a retransmission request asking for retransmission thereof, and outputs the request for the relay transmitter. If storing the requested data frame in its retransmission frame buffer, the relay transmitter deletes the data frame's frame number from the retransmission request, and then transfer the request. Thereafter, the relay transmitter adds, to the retransmitted data frame, the data frame whose frame number has been deleted during last transfer.

27 Claims, 15 Drawing Sheets

RELAY TRANSMISSION METHOD AND SYSTEM, AND DEVICE USED THEREOF

BACKGROUND OF THE INVENTION

1. Field of the Invention

The present invention relates to methods and systems for relay transmission utilizing a relay transmitter located between data transmitters on the transmission and reception sides and, more specifically, to a method and a system for relay transmission in which data transmission is not done concurrently with data reception.

2. Description of the Background Art

In order to improve throughput of packet data transmission from a transmitter on the transmission side to a transmitter on the reception side via a relay transmitter, a technology disclosed in Japanese Patent Laid-Open Publication No. 9-181772 (97-181772) may be a possibility. This conventional technology is described next below.

FIG. 15 is a diagram showing the structure of a data transmission system in the above conventional technology. In FIG. 15, the data transmission system includes a data terminal 1521 where data is generated, a data transmitter on the transmission side 1511 for transmitting the received data in the form of packet, a relay transmitter 1512 for receiving the packet data from the data transmitter on the transmission side 1511 via a low-orbit satellite circuit 1503, a relay transmitter 1513 for receiving the packet data from the relay transmitter 1512 via a stationary-satellite circuit 1504, a data transmitter on the reception side 1514 for receiving the packet data from the relay transmitter 1513 via a radio circuit 1505 being a cellular network, and a data terminal 1522 for receiving the data from the data transmitter on the reception side 1514 for data processing.

Described next is the operation of the data transmission system. The data transmitted from the data terminal 1521 is provided with an error detection code by the data transmitter on the transmission side 1511 for transmission in the form of packet. The data packet is relayed via the relay transmitters 1512 and 1513 to the data transmitter on the reception side 1514.

If any packet erroneously disappears during such relay transmission on a data link, its disappearance is informed by the to-be-transmitted next packet. Once detected such packet disappearance, the relay transmitter transmits a retransmission request to the transmitter preceding thereto. The requested transmitter then retransmits a packet identical to the disappeared.

In such conventional data transmission system, data transmission and reception can be simultaneously done since transmission media on one data link are independent of each other. Accordingly, the retransmission request with an arbitrary timing from the relay transmitter causes no influence on data transmission carried out on other data links.

Here, in simultaneous data transmission and reception by radio, a radio wave is generally intensely emitted by a transmitter for radio transmission but is weakly received because it has traveled across the long distance. Consequently, the radio wave during transmission interferes with that during reception, rendering data reception difficult. This is an exemplary near-far problem. Moreover, if a transmission channel and a reception channel are close in frequency to each other in such case, interference therebetween is increased due to leakage of signal component from the transmission channel, rendering data reception more difficult. If those channels are equal in frequency, needless to say, the difficulty for data reception gets considerably high. Thus, transmitting the retransmission request in the conventional data transmission system may affect data transmission on other data links, resulting in transmission failure. In order to avoid such a problem, a carefully designed circuit for assuredly receiving data is required, although leading to high cost and another effort to design and manufacture a device equipped with such a circuit.

To reduce cost and size of the transmitters, equipping each transmitter with only one radio modem is effective. Generally, the radio modem, however, is functionally incapable of simultaneously performing data transmission and reception even in the different frequencies, and switching between the frequencies must be concurrently done. Consequently, if those transmitters share the same frequency of channel, the retransmission request transmitted in the conventional manner may collide with data being transmitted on other data links, resulting in transmission failure. Even if the transmitters do not share the same frequency of channel, the radio modems should be switched between frequencies with appropriate timing, otherwise failed in relay.

SUMMARY OF THE INVENTION

Therefore, an object of the present invention is to provide a method and a system for relay transmission being free from data collision with a transmission request on data links and accordingly causing no failure in relay.

The present invention has the following features to attain the object above.

A first aspect of the present invention is directed to a relay transmission method for not-concurrently performing data transmission and reception, and sequentially transmitting a data frame from a transmitter on the transmission side to a transmitter on the reception side via one or more relay transmitters, the method comprises: a data transmission step of plurally transmitting the data frame with a frame number added from the transmitter on the transmission side to the transmitter on the reception side; a data transfer step of sequentially transferring the data frame by one or more relay transmitters; a retransmission request transmission step of transmitting, to the transmitter on the transmission side, a retransmission request indicating any data frame, by frame number, which has not normally received by the transmitter on the reception side; a retransmission request transfer step of sequentially transferring the retransmission request by one or more relay transmitters; a data retransmission step of sequentially retransmitting the data frame requested by the retransmission request from the transmitter on the transmission side to the transmitter on the reception side; and a retransmission data transfer step of sequentially receiving and transferring the data frame by one or more relay transmitters.

As described above, in the first aspect, even if the transmitters share the same frequency, data transmission or retransmission request on a data link does not affect that being carried out on another data link, thereby preventing data collision. Further, by sequentially transferring data, data included in a control frame such as retransmission request frame is proportionally increased. Therefore, data transfer can be efficiently done. Still further, by shortening a frame, retransmission can be efficiently achieved even on a radio transmission path where an error rate is high.

According to a second aspect, further to the first aspect, the data transfer step comprises the steps of: storing, in a buffer each provided in one or more relay transmitters, any data frame normally received thereby; and sequentially transferring the normally-received data frame. Further, the retransmission request transfer step comprises the steps of: deleting, from the retransmission request received by one or more relay transmitters, any frame number corresponding to the data frame stored in the buffer therein; and sequentially transferring the retransmission request after deletion of numbers. Still further, the retransmission data transfer step comprises the steps of: adding, to the data frame received by one or more relay transmitters, any data frame stored in the buffer; and sequentially transferring the data frame added with a newly-generated data frame.

As described above, in the second aspect, the number of data frames retransmitted from the transmission on the transmission side can be reduced, thereby shortening time for retransmission and thus increasing the efficiency of retransmission.

According to a third aspect, further to the second aspect, the retransmission request transfer step further comprises the steps of: determining whether the buffer stores every frame number included in the retransmission request received by one or more relay transmitters; and retransmitting, if determined every frame number included, the data frame requested by the retransmission request to the transmitter on the reception side, and if determined not included, deleting the frame number found in the buffer from the retransmission request for sequential transfer.

As described above, in the third aspect, any wasteful retransmission request is prevented.

According to a fourth aspect, further to the first aspect, one or more relay transmitters have a directional antenna which is initially adjusted in a predetermined direction, wherein the data transfer step, the retransmission request transfer steps. Further, the retransmission data transfer step comprise the steps of: setting, at data reception, a retention time Ta for the directional antenna to be in the predetermined direction by one or more relay transmitters; adjusting the directional antenna in a direction where an adjacent transmitter on transmission side is located by one or more relay transmitters; and readjusting, with a lapse of the retention time Ta, the directional antenna back in the initially predetermined direction by one or more relay transmitters.

As described above, in the fourth aspect, in a case where a transmission path is a radio transmission path, a directional antenna is used and changed its direction depending on from which data comes. In this manner, a relay transmitter by radio can be directionally set for transmission/reception so that multipath fading can be prevented. Further, the antenna can be adjusted to be ready for next transmission frame without waiting, i.e., no longer than required, for transmission frames which have not transmitted due to some error. Therefore, data transfer can be assuredly achieved.

According to a fifth aspect, further to the fourth aspect, the directional antenna is plurally provided; and the directional antennas are switched there among for setting direction thereof.

As described above, in the fifth aspect, a directional antenna is used and changed its direction depending on from which data comes. In this manner, a relay transmitter by radio can be directionally set for transmission/reception so that multipath fading can be efficiently prevented.

According to a sixth aspect, further to the first aspect, in one or more relay transmitters, a predetermined frequency channel is initially selected among plural, and the data transfer step, the retransmission request transfer step, and the retransmission data transfer step comprise the steps of:

setting, at data reception, a retention time Ta to be in the predetermined frequency channel by one or more relay transmitters; selecting a frequency channel for communicating with the transmitter on the transmission side by one or more relay transmitters; and selecting again, with a lapse of the retention time Ta, the predetermined initial frequency channel by one or more relay transmitters.

As described above, in the sixth aspect, each different frequency channel is available for transmitters. Therefore, even if any disturbance wave source is observed in the vicinity of the transmitters, and even if such source has each different frequency characteristics, the transmitters can be in each appropriate frequency channel. Accordingly, a throughput can be increased.

According to a seventh aspect, further to the sixth aspect, selection of the frequency channel is based on which frequency channel shows a maximum throughput with the transmitter on the transmission side.

As described above, in the seventh aspect, a throughput can be maximized by selecting the frequency channel appropriately for each communications section.

According to an eighth aspect, further to the first aspect, the data frame and the retransmission request are each additionally provided with transfer valid period information indicating a predetermined time left for transfer. Further, the data transmission step comprising the steps of: calculating, by sequentially deducting a time taken for transmitting one data frame from the predetermined time, a time left for transfer; and adding the calculated time left for transfer as another transfer valid period information. The data transfer step, the retransmission request transmission step, the retransmission request transfer step, the data retransmission step, and the retransmission data transfer step comprise the steps of calculating, by sequentially deducting a time taken between data reception and transmission from the transfer valid period information included in the data frame or the retransmission request, the time left for transfer; adding the calculated time left for transfer as another transfer valid period information; and stopping data transmission or transfer when the another transfer valid period information becomes negative.

As described above, in the eighth aspect, each transmitter can know a time left for transfer on the path, preventing data transfer from being carried out after a transfer valid period.

According to a ninth aspect, further to the eighth aspect, the transfer valid period information is a natural number N when the time taken for transmitting one frame is presumed to be 1.

As described above, in the ninth aspect, the efficiency of data transfer can be improved by reducing an area of the transfer valid period information added to the transmission frame.

According to a tenth aspect, further to the eighth aspect, one or more relay transmitters each have a directional antenna which is initially adjusted in a predetermined direction. The data transfer step, the retransmission request transfer step, and the retransmission data transfer step comprise the steps of:

setting a retention time Ta for the directional antenna to be in the predetermined direction by one or more relay transmitters using the transfer valid period information; adjusting the directional antenna in a direction where the transmitter on transmission side is located by one or more relay transmitters; and readjusting, with a lapse of the retention time Ta, the directional antenna back in the initially predetermined direction by one or more relay transmitters.

As described above, in the tenth aspect, in a case where a transmission path is a radio transmission path, a directional antenna is used and changes its direction depending on from which data comes. In this manner, a relay transmitter by radio can be directionally set for transmission/reception so that multipath fading can be prevented. Further, the antenna can be adjusted to be ready for next transmission frame without waiting, i.e., no longer than required, for transmission frames which have not transmitted due to some error. Therefore, data transfer can be assuredly achieved.

According to an eleventh aspect, further to the eighth aspect, in one or more relay transmitters, a predetermined frequency channel is initially selected among plural. The data transfer step, the retransmission request transfer step, and the retransmission data transfer step comprise the steps of: setting, at data reception, a retention time Ta to be in the predetermined channel by one or more relay transmitters; selecting a frequency channel for communicating with the transmitter on the transmission side by one or more relay transmitters; and selecting again, with a lapse of the retention time Ta, the predetermined initial frequency channel by one or more relay transmitters.

As described above, in the eleventh aspect, when a transmission path is a radio transmission path, each different frequency channel is available for transmitters. Therefore, even if any disturbance wave source is observed in the vicinity of the transmitters, and even if such source has each different frequency characteristics, the transmitters can be in each appropriate frequency channel. Accordingly, a throughput can be increased. Further, the frequency channel can be set to be ready for next transmission frame without waiting, i.e., no longer than required, for transmission frames which have not transmitted due to some error. Therefore, data transfer can be assuredly achieved. According to a twelfth aspect, further to the first aspect, the retransmission request transmission step comprising the steps of: comparing a predetermined time allowed for the transmitter on the transmission side to start next transmission with a maximum length of time taken to retransmit data responding to the retransmission request, and not transmitting the retransmission request when the predetermined time is smaller in value, and when the predetermined time is equal or larger, transmitting a retransmission request indicating any data frame, by frame number, which has not normally received by the transmitter on the reception side to the transmitter on the transmission side.

As described above, in the twelfth aspect, data collision can be successfully prevented, especially data collision often observed between a current transmission and the following transmission when data transmission is repeated with a predetermined intervals to attain a constant throughput. This is occurred because the number of retransmission cannot be specified depending on in which state the transmission path is.

According to a thirteenth aspect, further to the twelfth aspect, the maximum length of time taken to retransmit data responding to the retransmission request is obtained by adding 1 to the number of to-be-retransmitted frames, multiplying the value by the number of transfers and a time taken to transmit one frame, and adding the value with α (a predetermined value determined by processing capability).

As described above, in the thirteenth aspect, a manner to calculate the maximum length of time taken for retransmission in the twelfth aspect is typically specified. In this manner, the transmitter on the reception side can easily determine whether to transmit a retransmission request. Further, data collision can be prevented between a current transmission and the following transmission. Still further, the calculation done in the transmitter on the reception side can be simplified.

A fourteenth aspect of the present invention is directed to a relay transmission system for non-concurrently performing data transmission and reception, and sequentially transmitting a data frame from a transmitter on the transmission side to a transmitter on the reception side via one or more relay transmitters. The transmitter on the transmission side in accordance with the fourteenth aspect of the present invention comprises: a reception part for receiving a retransmission request indicating any data frame, by frame number, which has not normally received by the transmitter on the reception side; a frame header analysis part for extracting a frame number from the retransmission request received by the reception part; a data frame generation part for generating a retransmission data frame by adding transmission data with the frame number; and a transmission part for transmitting the transmission data frame. The transmitter on the reception side in accordance with the fourteenth aspect of the present invention comprises: a reception part for receiving the data frame; a frame header analysis part for extracting the frame number from the data frame received by the reception part; a retransmission request frame generation part for generating a retransmission request including the frame number of the data frame not normally received by the transmitter on the reception side; and a transmission part for transmitting the retransmission request. One or more relay transmitters in accordance with the fourteenth aspect of the present invention each comprises: a reception part for receiving the data frame or the retransmission request; and a transmission part for transmitting the data frame or the retransmission request received by the reception part. When the transmitter on the reception side fails to receive every data frame transmitted by the transmitter on the transmission side, the transmitter on the reception side transmits the retransmission request, and responding thereto, the transmitter on the transmission side sequentially retransmits the data frame to the transmitter on the reception side.

As described above, in the fourteenth aspect, even if the transmitters share the same frequency, data transmission or retransmission request on a data link does not affect that being carried out on another data link, thereby preventing data collision. Further, by sequentially transferring data, data included in a control frame such as retransmission request frame is proportionally increased. Therefore, data transfer can be efficiently done. Still further, by shortening a frame, retransmission can be efficiently achieved even on a radio transmission path where an error rate is high.

According to a fifteenth aspect, further to the fourteenth aspect, one or more relay transmitters each further comprises: a retransmission frame buffer for storing any normally-received data frame, and generating a transmission data frame, in response to retransmission of data frame by the transmitter on the transmission side, a transmission data frame by adding the stored data frame to the data frame; and a retransmission request frame reconstruction part for deleting, from the retransmission request, any frame number corresponding to the data frame stored in the retransmission frame buffer.

As described above, in the fifteenth aspect, the number of data frames retransmitted from the transmission on the transmission side can be reduced, thereby shortening time for retransmission and thus increasing the efficiency of retransmission.

According to a sixteenth aspect, further to the fourteenth aspect, one or more relay transmitters further comprise: a directional antenna for transmitting/receiving a signal; and an antenna control part for controlling the directional antenna to direct in a direction where the signal goes/comes, and readjusting the directional antenna in a predetermined initial direction with a lapse of a predetermined retention time Ta.

As described above, in the sixteenth aspect, in a case where a transmission path is a radio transmission path, a directional antenna is used and changed its direction depending on from which data comes. In this manner, a relay transmitter by radio can be directionally set for transmission/reception so that multipath fading can be prevented. Further, the antenna can be adjusted to be ready for next transmission frame without waiting, i.e., no longer than required, for transmission frames which have not transmitted due to some error. Therefore, data transfer can be assuredly achieved.

According to a seventeenth aspect, further to the fourteenth aspect, one or more relay transmitters each further comprise: a directional antenna for transmitting/receiving a signal; an antenna switching part for selectively switching among plurally-provided the directional antennas; and an antenna control part for controlling the antenna switching part to direct the directional antennas in a direction where the signal goes/comes, and with a lapse of a predetermined retention time Ta, readjusting the directional antennas in the predetermined initial direction.

As described above, in the seventeenth aspect, a directional antenna is used and changed its direction depending on from which data comes. In this manner, a relay transmitter by radio can be directionally set for transmission/reception so that multipath fading can be efficiently prevented.

According to an eighteenth aspect, further to the fourteenth aspect, one or more relay transmitters each further comprise a frequency channel control part for selecting a frequency channel among plural, and with a lapse of a predetermined retention time Ta set to be in the selected frequency channel, reselecting the same frequency channel, and the transmission part and the reception part transmit/receive a signal in the frequency channel selected by the frequency channel control part.

As described above, in the eighteenth aspect, when a transmission path is a radio transmission path, each different frequency channel is available for transmitters. Therefore, even if any disturbance wave source is observed in the vicinity of the transmitters, and even if such source has each different frequency characteristics, the transmitters can be in each appropriate frequency channel. Accordingly, a throughput can be increased. Further, the frequency channel can be set to be ready for next transmission frame without waiting, i.e., no longer than required, for transmission frames which have not transmitted due to some error. Therefore, data transfer can be assuredly achieved.

According to a nineteenth aspect, further to the fourteenth aspect, the transmitter on the transmission side further comprises: a transfer valid period control part for calculating a time left for transfer, as another transfer valid period information, by sequentially deducting a time taken for transmitting one data frame from transfer valid period information indicating a predetermined time allowed for the transfer, and stopping transmission when the transfer valid period information becomes negative, and a transfer valid period addition part for adding the transfer valid period information to the data frame. The transmitter on the reception side, in accordance with the nineteenth aspect, comprises: a transfer valid period control part for calculating a time left for transfer, as another transfer valid period information, by sequentially deducting a time taken for transmitting one data frame from transfer valid period information indicating a predetermined time allowed for the transfer, and stopping transmission when the transfer valid period information becomes negative, and a transfer valid period addition part for adding the transfer valid period information to the retransmission request. One or more relay transmitters, in accordance with the nineteenth aspect, each further comprises: a transfer valid period control part for calculating a time left for transfer, as another transfer valid period information, by sequentially deducting a time taken between data reception and transmission from the transfer valid period information included in the data frame or the retransmission request, and stopping transmission when the transfer valid period information becomes negative, and a transfer valid period addition part for adding the transfer valid period information to the data frame or the retransmission request.

As described above, in the nineteenth aspect, each transmitter can know a time left for transfer on the path, preventing data transfer from being carried out after a transfer valid period.

According to a twentieth aspect, further to the nineteenth aspect, the transfer valid period information is a natural number N when the time taken for transmitting one frame is presumed to be 1.

According to a twenty-first aspect, further to the nineteenth aspect, one or more relay transmitters each further comprise: a directional antenna for transmitting/receiving a signal; and an antenna control part for controlling the directional antenna to direct in a direction where the signal goes/comes, and readjusting the directional antenna in a predetermined initial direction with a lapse of a predetermined retention time Ta determined by using the transfer valid period information.

As described above, in the twenty-first aspect, in a case where a transmission path is a radio transmission path, a directional antenna is used and changed its direction depending on from which data comes. In this manner, a relay transmitter by radio can be directionally set for transmission/reception so that multipath fading can be prevented. Further, the antenna can be adjusted to be ready for next transmission frame without waiting, i.e., no longer than required, for transmission frames which have not transmitted due to some error. Therefore, data transfer can be assuredly achieved.

According to a twenty-second aspect, further to the nineteenth aspect, one or more relay transmitters each further comprise a frequency channel control part for selecting a frequency channel among plural to receive/transmit a signal, and with a lapse of a predetermined retention time Ta determined using the transfer valid period information, reselecting the same frequency channel, and the transmission part and the reception part transmit/receive a signal in the frequency channel selected by the frequency channel control part.

As described above, in the twenty-second aspect, when a transmission path is a radio transmission path, each different frequency channel is available for transmitters. Therefore, even if any disturbance wave source is observed in the vicinity of the transmitters, and even if such source has each different frequency characteristics, the transmitters can be in each appropriate frequency channel. Accordingly, a throughput can be increased. Further, the frequency channel can be set to be ready for next transmission frame without waiting, i.e., no longer than required, for transmission frames which have not transmitted due to some error. Therefore, data transfer can be assuredly achieved. A twenty-third aspect of the present invention is directed to a transmitter on the transmission side for non-concurrently performing data transmission and reception, and sequentially transmitting a data frame to a transmitter on the reception side via one or more relay transmitters. A transmitter in accordance with the twenty-third aspect of the present invention comprises: a reception part for receiving a retransmission request indicating any data frame, by frame number, which has not normally received by the transmitter on the reception side; a frame header analysis part for extracting a frame number from the retransmission request received by the reception part; a data frame generation part for generating a retransmission data frame by adding transmission data with the frame number; and a transmission part for transmitting the transmission data frames. When the transmitter on the reception side fails to receive every data frame transmitted, the transmitter on the reception side transmits the retransmission request, and responding thereto, the transmitter on the transmission side sequentially retransmits the data frame to the transmitter on the reception side.

As described above, in the twenty-third aspect, even if the transmitters share the same frequency, data transmission or retransmission request on a data link does not affect that being carried out on another data link, thereby preventing data collision. Further, by sequentially transferring data, data included in a control frame such as retransmission request frame is proportionally increased. Therefore, data transfer can be efficiently done. Still further, by shortening a frame, retransmission can be efficiently achieved even on a radio transmission path where an error rate is high.

According to a twenty-fourth aspect, the twenty-third aspect, the transmitter on the transmission side further comprises: a transfer valid period control part for calculating a time left for transfer, as another transfer valid period information, by sequentially deducting a time taken for transmitting one data frame from transfer valid period information indicating a predetermined time allowed for the transfer, and stopping transmission when the transfer valid period information becomes negative, and a transfer valid period addition part for adding the transfer valid period information to the data frame.

As described above, in the twenty-fourth aspect, the number of data frames retransmitted from the transmission on the transmission side can be reduced, thereby shortening time for retransmission and thus increasing the efficiency of retransmission.

A twenty-fifth aspect of the present invention is directed to a transmitter on the reception side for non-concurrently performing data transmission and reception, and sequentially transmitting a data frame to a transmitter on the transmission side via one or more relay transmitters. A transmitter in accordance with the twenty-fifth aspect of the present invention comprises: a reception part for receiving the data frame; a frame header analysis part for extracting the frame number from the data frame received by the reception part; a retransmission request frame generation part for generating a retransmission request including the frame number of the data frame not normally received by the transmitter on the reception side; and a transmission part for transmitting the retransmission request. When failed to receive every data frame transmitted from the transmitter on the transmission side, transmits the retransmission request, and responding thereto, the transmitter on the transmission side sequentially retransmits the data frame.

As described above, in the twenty-fifth aspect, even if the transmitters share the same frequency, data transmission or retransmission request on a data link does not affect that being carried out on another data link, thereby preventing data collision. Further, by sequentially transferring data, data included in a control frame such as retransmission request frame is proportionally increased. Therefore, data transfer can be efficiently done. Still further, by shortening a frame, retransmission can be efficiently achieved even on a radio transmission path where an error rate is high.

According to a twenty-sixth aspect, further to the twenty-fifth aspect the transmitter on the reception side further comprises: a transfer valid period control part for calculating a time left for transfer, as another transfer valid period information, by sequentially deducting a time taken for transmitting one data frame from transfer valid period information indicating a predetermined time allowed for the transfer, and stopping transmission when the transfer valid period information becomes negative, and a transfer valid period addition part for adding the transfer valid period information to the retransmission request.

As described above, in the twenty-sixth aspect, the number of data frames retransmitted from the transmission on the transmission side can be reduced, thereby shortening time for retransmission and thus increasing the efficiency of retransmission.

A twenty-seventh aspect of the present invention is directed to one or more relay transmitters for non-concurrently performing data transmission and reception, and sequentially transmitting a data frame from a transmitter on the transmission side to a transmitter on the reception Sides. Each relay transmitter in accordance with the twenty-seventh aspect of the present invention comprises: a reception part for receiving the data frame or the retransmission request; and a transmission part for transmitting the data frame or the retransmission request received by the reception part. When the transmitter on the reception side failed to receive every data frame transmitted by the transmitter on the transmission side, the transmitter on the reception side transmits the retransmission request, and responding thereto, the transmitter on the transmission side sequentially retransmits the data frame to the transmitter on the reception side.

As described above, in the twenty-seventh aspect, even if the transmitters share the same frequency, data transmission or retransmission request on a data link does not affect that being carried out on another data link, thereby preventing data collision. Further, by sequentially transferring data, data included in a control frame such as retransmission request frame is proportionally increased. Therefore, data transfer can be efficiently done. Still further, by shortening a frame, retransmission can be efficiently achieved even on a radio transmission path where an error rate is high.

According to a twenty-eighth aspect, further to the twenty-seventh aspect, one or more relay transmitters further comprises: a transfer valid period control part for calculating a time left for transfer, as another transfer valid period information, by sequentially deducting a time taken between data reception and transmission from the transfer valid period information included in the data frame or the retransmission request, and stopping transmission when the transfer valid period information becomes negative, and a transfer valid period addition part for adding the transfer valid period information to the data frame or the retransmission request.

As described above, in the twenty-eighth aspect, the number of data frames retransmitted from the transmission on the transmission side can be reduced, thereby shortening time for retransmission and thus increasing the efficiency of retransmission.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
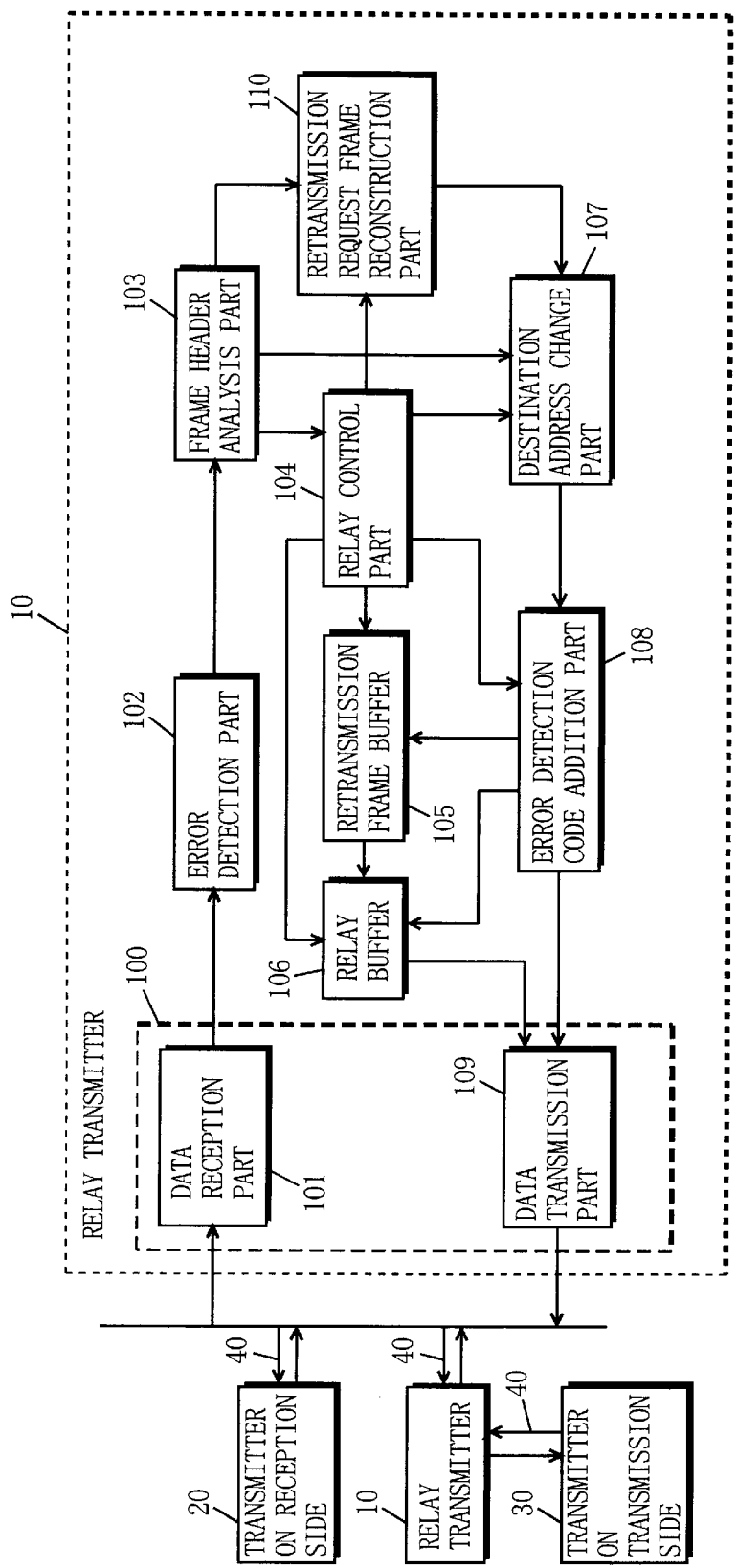
FIG. 1 is a block diagram showing the structure of a relay transmitter applying a relay transmission method according to a first embodiment of the present invention.
Figure 2:
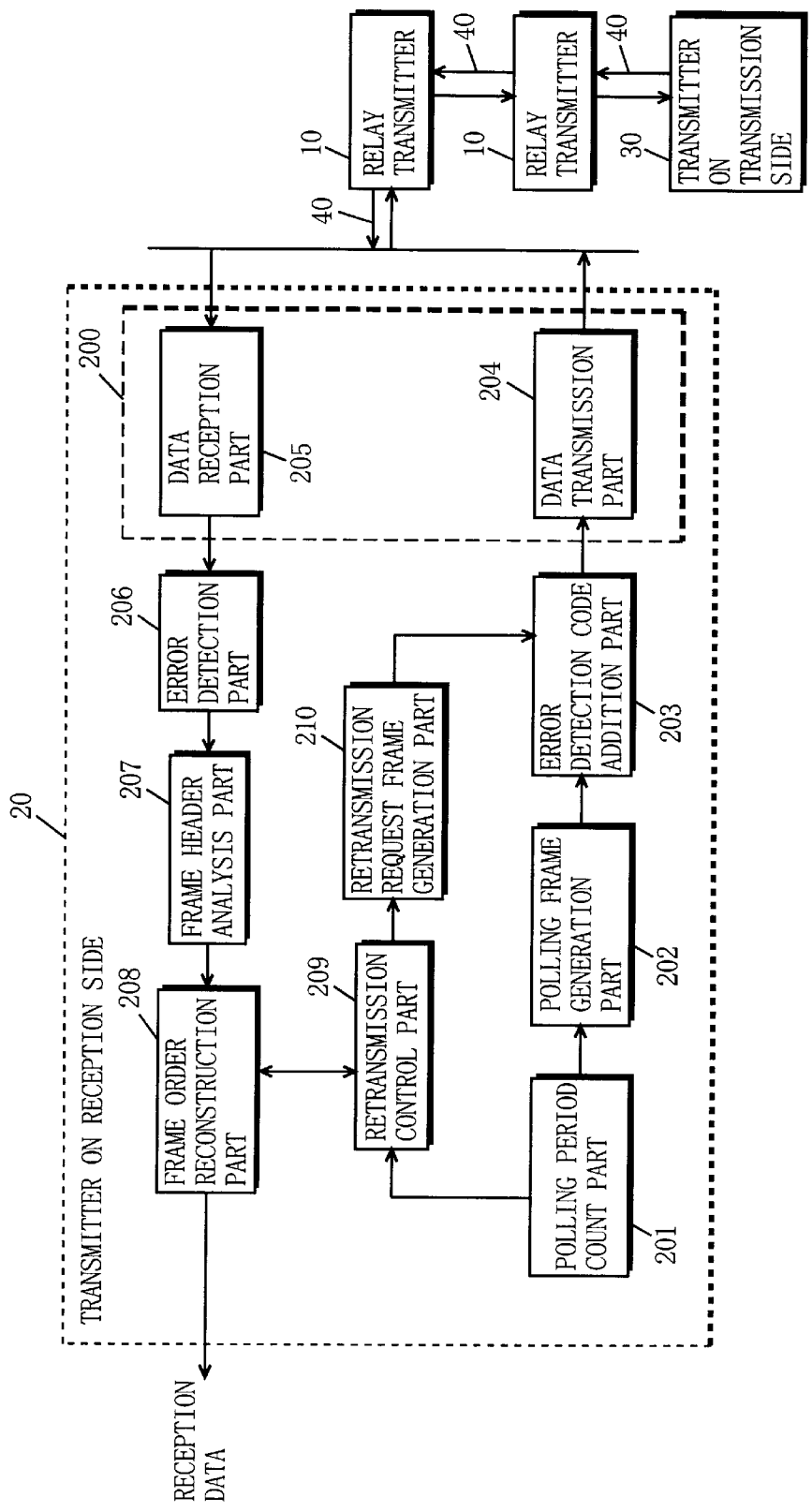
FIG. 2 is a block diagram showing the structure of a receiver applying the relay transmission method of the first embodiment.
Figure 3:
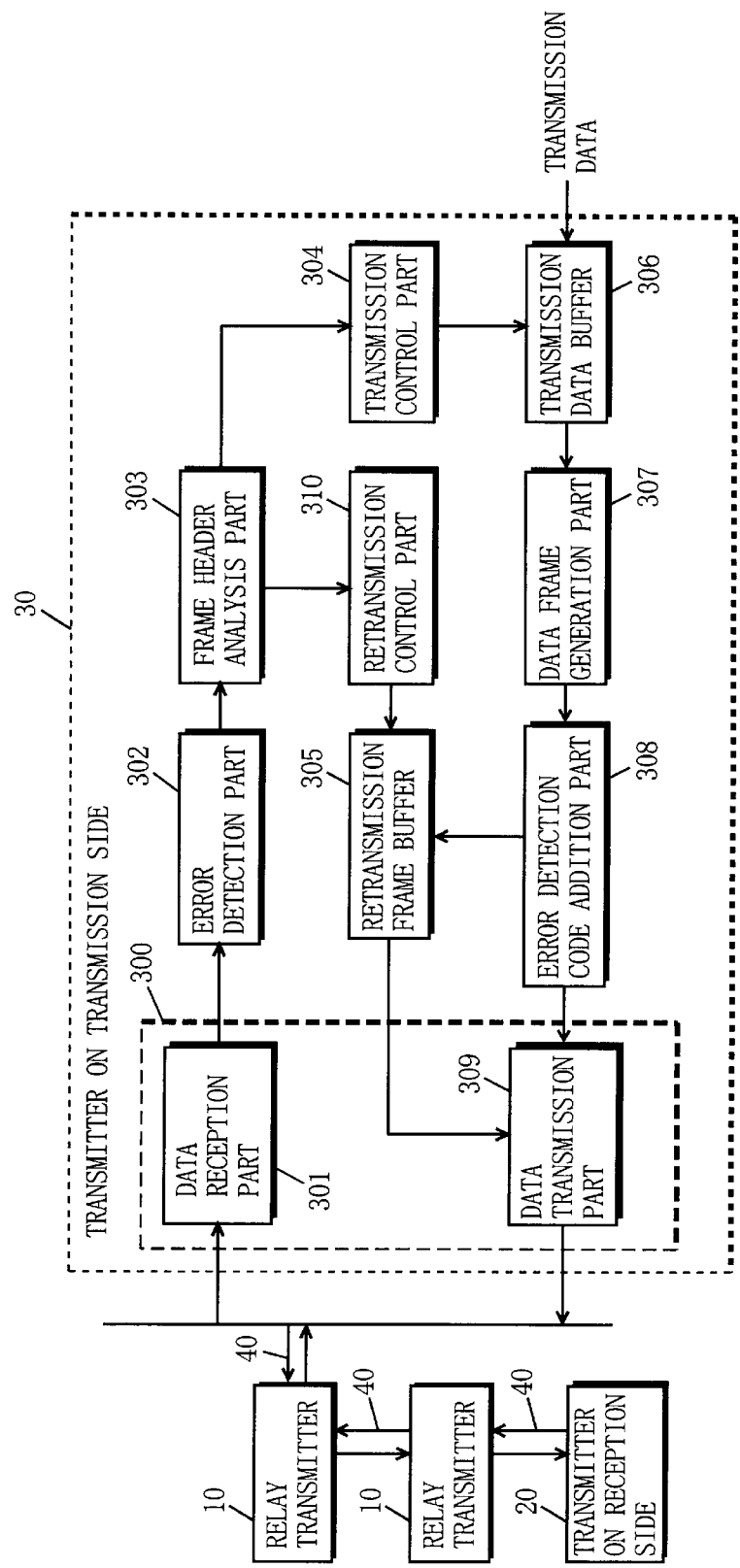
FIG. 3 is a block diagram showing the structure of a transmitter applying the relay transmission method of the first embodiment.

FIGS. 1 to 3 are diagrams showing the structure of a data transmission system according to a first embodiment of the present invention. Specifically, FIG. 1 shows the structure of a relay transmitter 10 located between transmitters on the transmission and reception sides 30 and 20 for increasing the distance for data transmission, FIG. 2 the structure of the transmitter on the reception side 20 for receiving data transmitted from the transmitter on the transmission side 30, and FIG. 3 the structure of the data transmitter on the transmission side 30. In these drawings, the transmitter on the reception side 20, transmitter on the transmission side 30, and relay transmitter 10 are connected to one another via transmission paths 40. Each of such devices is structurally and operationally described next below.

In FIG. 1, the relay transmitter 10 is provided with a data reception part 101 for demodulating a transmission wave on the transmission path 40 so as to generate a transmission frame including polling frame, retransmission request frame, data frame, and the like, an error detection part 102 for detecting any error in the transmission frame using an error detection code added to the transmission frame, a frame header analysis part 103 for analyzing the transmission frame for its frame type and destination address, a relay control part 104 for controlling other parts, a retransmission frame buffer 105 for accumulating a to-be-retransmitted transmission frame, a relay buffer 106 for accumulating the transmission frame at relay, a destination address change part 107 for rewriting the destination address in the transmission frame, an error detection code addition part 108 for calculating and rewriting the error detection code in the transmission frame, a data transmission part 109 for modulating the transmission frame for send-out onto the transmission path as another transmission wave, and a retransmission request frame reconstruction part 110 for changing a frame number in a retransmission request frame requested for retransmission.

The data reception and transmission parts 101 and 109 are typically in a single modem 100, resulting in no simultaneous data transmission and reception. Here, there is no need to put those in the same modem as long as simultaneous data transmission and reception is prevented. This is for avoiding the above-described near-far problem and interference between adjoining channels, for example.

Described next is the operation of the relay transmitter 10. In the relay transmitter 10, the data reception part 101 receives a transmission frame. The error detecting part 102 determines whether the received transmission frame is normal. If any error is detected in the frame, the error detection part 102 discards the frame. Otherwise, the frame is analyzed for information by the frame header analysis part 103.

If the analyzed frame is determined as being a polling frame addressed to its own terminal, the frame header analysis part 103 informs the relay control part 104. The relay control part 104 clears the retransmission frame buffer 105 and the relay buffer 106. The frame header analysis part 103 also outputs the analyzed frame to the destination address change part 107. In response thereto, the destination address change part 107 rewrites the frame to address to the transmitter on the transmission side, and then outputs the frame to the error detection code addition part 108. Therein, the frame is provided with an error detection code, and outputted out of the data transmission part 109.

If the analyzed frame is determined as being a data frame addressed to its own terminal, the frame header analysis part 103 informs the relay control part 104. The frame header analysis part 103 also outputs the analyzed frame to the destination address change part 107. In response thereto, the destination address change part 107 rewrites the frame to address to the transmitter on the reception side, and then outputs the frame to the error detection code addition part 108. Therein, the frame is provided with an error detection code, and accumulated in the retransmission frame buffer 105. The frame is also stored in the relay buffer 106. The relay control part 104 controls, if detected reception of a series of data frames having been completed, data stored in there lay buffer 106 to be transmitted out of the data transmission part 109, and then clears the relay buffer 106.

Moreover, if the analyzed frame is determined as being a retransmission request frame addressed to its own terminal, the frame header analysis part 103 informs the relay control part 104. The retransmission request frame also goes to the retransmission request frame reconstruction part 110. The relay control part 104 clears the relay buffer 106, and then determines whether the retransmission frame buffer part 105 has every data frame requested for retransmission. If every data frame is found therein, the data frame(s) is stored in there lay buffer 106. The relay control part 104 also informs the retransmission request frame reconstruction part 110 of the data frame(s) by frame number not found in the retransmission frame buffer 105.

The retransmission request frame reconstruction part 110 removes, out of the retransmission request frame, any frame number(s) already stored in the retransmission frame buffer 105, and forwards the retransmission request frame to the destination address change part 107. The destination address change part 107 rewrites the retransmission request frame address to the transmitter on the transmission side, and then outputs the frame to the error detection code addition part 108. Therein, the retransmission request frame is provided with an error detection code, and transmitted out of the data transmission part 109.

In FIG. 2, the transmitter on the reception side 20 is provided with a polling period count part 201 for counting time, and forwarding a command of polling transmission at predetermined intervals, a polling frame generation part 202 for generating a polling frame, an error detection code addition part 203 for calculating an error detection code and adding that to the transmission frame, a data transmission part 204 for modulating the transmission frame for send-out onto a transmission path as a transmission wave, a data reception part 205 for demodulating the transmission wave on the transmission path so as to generate a transmission frame including a polling frame, retransmission request frame, data frame, and the like, an error detection part 206 for detecting any error in the transmission frame using the error detection code added to the transmission frame, a frame header analysis part 207 for analyzing the transmission frame for its frame type and destination address, a frame order reconstruction part 208 for accumulating data frames, reading out those in order of frame number as instructed, and extracting data part for output, a retransmission control part 209 for controlling retransmission of any data frame not normally received, and a retransmission request frame generation part 210 for generating a retransmission request frame including the frame number(s) of the data frame(s) requested for retransmission.

The data reception and transmission parts 205 and 204 are typically in a single modem 200. Here, as described in the foregoing, there is no need to put those in the same modem as long as simultaneous data transmission and reception is prevented.

Described next is the operation of the transmitter on the reception side 20. In the transmitter on the reception side 20, the polling period count part 201 forwards a command of polling transmission, at predetermined intervals, to the polling frame generation part 202 and the retransmission control part 209. In response thereto, the polling frame generation part 202 generates a polling frame addressed to the adjoining relay transmitter for output to the error detection code addition part 203. Therein, the polling frame is provided with an error detection code, and transmitted out of the data transmission part 204.

The error detection part determines whether the transmission frame received by the data reception part 205 is normal. If any error is detected in the frame, the error detection part 206 discards the frame. Otherwise, the frame is analyzed for information by the frame header analysis part 207. If the analyzed frame is determined as being a data frame addressed to its own terminal, the frame is accumulated in the frame order reconstruction part 208. The retransmission control part 209 then detects, after receiving a series of data, whether every data has been accumulated in the frame order reconstruction part 208. If every data frame is found therein, the retransmission control part 209 brings the frame order reconstruction part 208 to output the accumulated data frames in order of frame number. Here, the output is reception data.

If any data frame has not yet reached the frame order reconstruction part 208, the retransmission control part 209 calculates, based on the timing when the last command of polling transmission was inputted from the polling period count part 201, a length of time until the next polling transmission. The calculated time is compared with a value calculated by an equation of (the number of to-be-retransmitted frames+1)×(the number of transfers among the transmitters)×(a time taken to transmit one frame)+$\alpha$ (a constant determined by the processing capability) If the length of time exceeds the value, the retransmission control part 209 controls the retransmission request frame generation part 210 to generate a retransmission request frame, which includes the frame number(s) of the not-yet-reached data frame(s). Thus generated retransmission request frame is herein addressed to the adjacent relay transmitter. The generated retransmission request frame is added with an error detection code by the error detection code addition part 203, and is transmitted out of the data transmission part 204. On the other hand, when the calculated length of time until the next polling transmission is smaller than the value obtained by the above equation, the retransmission control part 209 stops transmission of the retransmission request frame.

In FIG. 3, the transmitter on the transmission side 30 is provided with a data reception part 301 for demodulating a transmission wave on a transmission path, and generating a transmission frame including a polling frame, retransmission request frame, data frame, and the like, an error detection part 302 for detecting any error in the transmission frame using an error detection code added to the transmission frame, a frame header analysis part 303 for analyzing the transmission frame for its type and destination address, a transmission control part 304 for controlling other parts, a retransmission frame buffer 305 for accumulating a to-be-transmitted transmission frame, a transmission data buffer 306 for accumulating transmission data, a data frame generation part 307 for adding the data with a frame number, another error detection code, and a destination address, an error detection code addition part 308 for calculating and adding the error detection code in the transmission frame, a data transmission part 309 for demodulating the transmission frame for send-out onto the transmission path as another transmission wave, and a retransmission control part 310 for retransmission control.

The data reception and transmission parts 301 and 309 are typically in a single modem 300. Here, as described in the foregoing, there is no need to put those in the same modem as long as simultaneous data transmission and reception is prevented.

Described next is the operation of the transmitter on the transmission side 30. In the transmitter on the transmission side 30, the data reception part 301 receives a transmission frame. The error detection part determines whether the received transmission frame is normal. If any error is detected in the frame, the error detection part 302 discards the frame. Otherwise, the frame is analyzed for information by the frame header analysis part 303.

If the analyzed frame is determined as being a polling frame addressed to its own terminal, the frame header analysis part 303 informs the transmission control part 304 and the retransmission control part 310. In response thereto, the retransmission control part 310 clears the retransmission frame buffer 305. Thereafter, the transmission control part 304 controls data in the transmission data buffer 306 to be outputted by the predetermined number for the data frame generation part 307. Therein, the data is then sequentially provided with a frame number. Thus, the data is framed, and addressed to the adjacent relay transmitter. The framed data is provided with an error detection code by the error detection code addition part 308. Then, the data is accumulated in the retransmission frame buffer 305, and transmitted out of the data transmission part 309.

If the analyzed frame is determined as being a retransmission request frame addressed to its own terminal, the frame header analysis part 303 informs the retransmission control part 310, and also forwards the retransmission request frame to the retransmission control part 310. The retransmission control part 310 extracts the frame number(s) in the received retransmission request frame, and then outputs the data frame(s) corresponding to the frame number (s) from the retransmission frame buffer 305 to the data transmission part 309. The outputted data is then transmitted out of the data transmission part 309.

Figure 4:
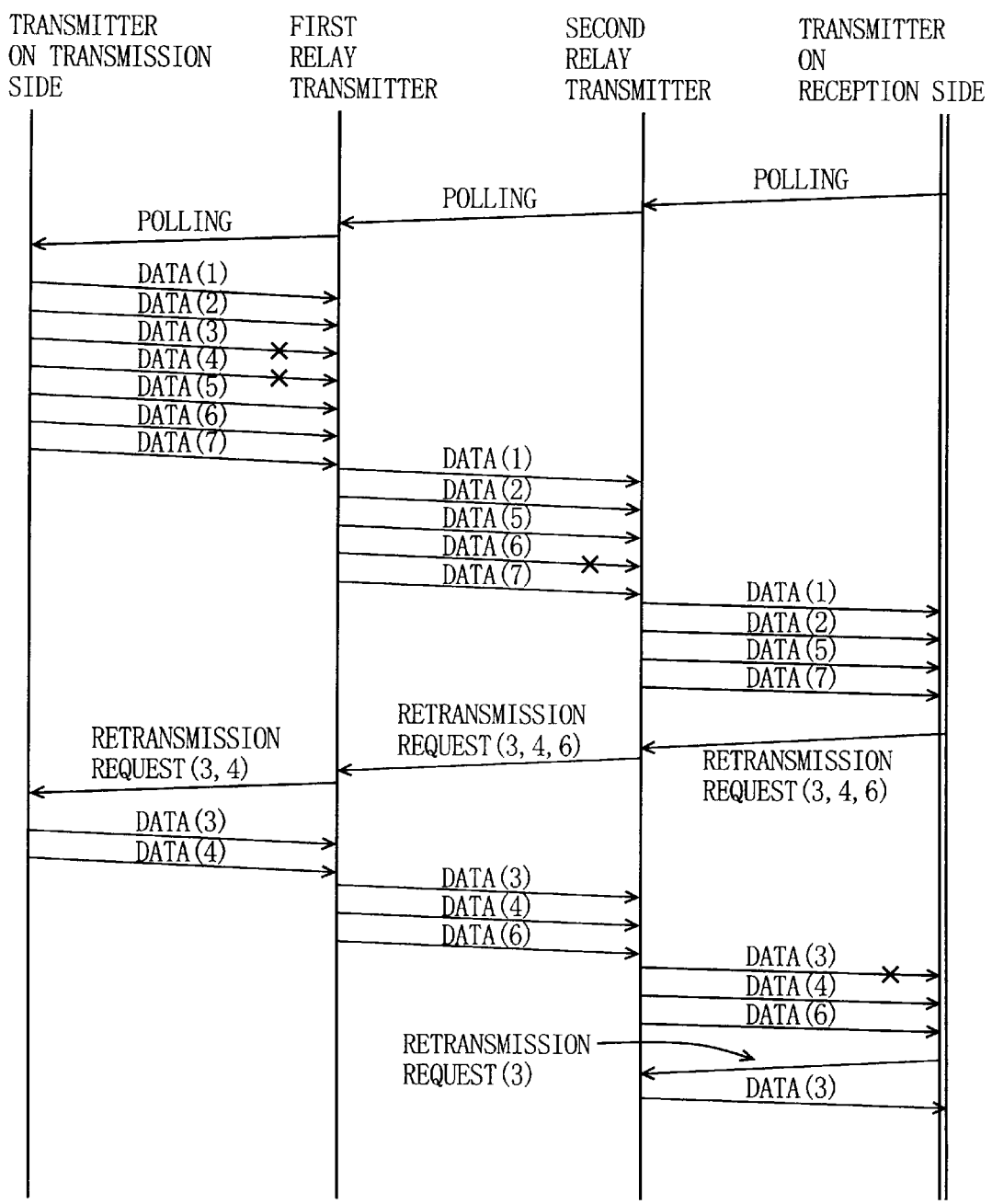
FIG. 4 is a diagram showing a sequence of the relay transmission method of the first embodiment.

FIG. 4 is a diagram showing a transfer sequence in the data transmission system of this embodiment. In this data transmission system, each device is presumed to perform radio data transmission in the same frequency range. Also, presumably, a polling generated in the transmitter on the reception side in this system goes to a second relay transmitter and then a first before reaching the transmitter on the transmission side.

In FIG. 4, once the polling is received, the transmitter on the transmission side transmits 1st to 7th data frames to the first relay transmitter. Herein, a cross in the drawing shows that any error occurs in the data frame. The crossed data frame is discarded by the transmitter on the reception side, the first relay transmitter, or the second relay transmitter.

The first relay transmitter stores the normally-received 1st, 2nd, 5th, 6th, and 7th data frames into its retransmission frame buffer as already described, and simultaneously, transmits those to the second relay transmitter. The second relay transmitter then stores the normally-received 1st, 2nd, 5th, and 7th data frames into its retransmission frame buffer, and simultaneously, transmits those to the transmitter on the reception side.

The transmitter on the reception side stores the 1st, 2nd, 5th, and 7th data frames as already described into the frame order reconstruction part 208. Then, the retransmission control part 209 determines that the 3rd, 4th, and 6th data frames are missing.

Assumed herein are a time taken to transmit one transmission frame being T, a polling transmission period being 40T, and a constant α of processing capability being 0. As is known from the above, the total number of already-transmitted frames is 19. Therefore, a length of time until the next polling is known as being 21T. Accordingly, the equation of (the number of to-be-retransmitted frames+1)×(the number of transfers among the transmitters)×(a time taken to transmit one transmission frame)+α will be (3+1)×3×T+0= 12T. Since the length of time until the next polling is larger in value, instructed here is generation of a retransmission request frame asking for retransmission of the 3rd, 4th, and 6th data frames. The retransmission request frame thus generated is transmitted to the second relay transmitter.

Here, the second relay transmitter does not have the 3rd, 4th, and 6th data frames stored in its retransmission frame buffer. Therefore, the retransmission request frame is forwarded to the first relay transmitter without any change.

The first relay transmitter has the 6th data frame stored in its retransmission frame buffer. Therefore, as described above, the 6th data frame is stored in the relay buffer. The frame number of the 6th data frame is then deleted from there transmission request frame, and another retransmission request frame is generated to request retransmission of the 3rd and 4th data frames. Such generated retransmission request frame is transmitted to the transmitter on the transmission side.

Responding to the request for retransmission, the transmitter on the transmission side transmits the 3rd and 4th data frames to the first relay transmitter. The first relay transmitter stores the 3rd and 4th data frames in its retransmission frame buffer, adds the 6th data frame to the 3rd and 4th data frames, and then transmits those data frames to the second relay transmitter. The second relay transmitter stores the 3rd, 4th, and 6th data frames in its retransmission frame buffer, and simultaneously, transmits those to the transmitter on the reception side.

The transmitter on the reception side stores the normally-received 4th and 6th data frames into the frame order reconstruction part 208. Thereafter, the retransmission control part 209 determines that the 3rd data frame is missing.

Here, a length of time until the next polling is 10T. Accordingly, the equation of (the number of to-be-retransmitted frames+1)×(the number of transfers among the transmitters)×(a time taken to transmit one transmission frame)+α will be (1+1)×3×T+0=6T. Since the length of time until the next polling is larger in value, instructed here is generation of a retransmission request frame asking for retransmission of the 3rd data frame. The retransmission request frame thus generated is transmitted to the second relay transmitter.

Here, the second relay transmitter has the 3rd data frame stored in its retransmission frame buffer. Therefore, the 3rd data frame is stored in the relay buffer. Herein, since the 3rd data frame is everything requested by the retransmission request frame, this is the end of transmission of the retransmission request frame. Thereafter, the 3rd data frame is transmitted from the second relay transmitter to the transmitter on the reception side.

The transmitter on the reception side stores the normally-received 3rd data frame in the frame order reconstruction part 208. Then, the retransmission control part 209 determines the data frame as being received, and then instructs the frame order reconstruction part 208 to output data. The frame order reconstruction part 208 then reads out the stored data frames in order of frame number for output.

As such, according to the data transmission system of this embodiment, the transmission order of the transmission frames is sequentially passed among the transmitters, and then data transmission and retransmission are performed. Thanks to this, even in a case where transmission on a data link affects transmission on another data link as does in a radio transmission path, relay transmission can be done with no problem. Further, retransmission can be efficiently achieved even on a transmission path where an error rate is high.

Note herein that, the number of relay transmitters in the data transmission system of this embodiment is two, that is, two-stage relay transmission is taken as an example. However, this is not restrictive and may be M-stage relay transmission (M is a natural number) where the number of transmitters is M. If this is the case, the data transmission system of this embodiment is still effective in the same level.

Further, in the data transmission system of this embodiment, a transmission path is presumably a radio transmission path. However, a wired transmission path on which the transmitters are connected in a bus shape is also a possibility. If this is the case, the data transmission system of this embodiment is also still effective in the same level.

Second Embodiment

Figure 5:
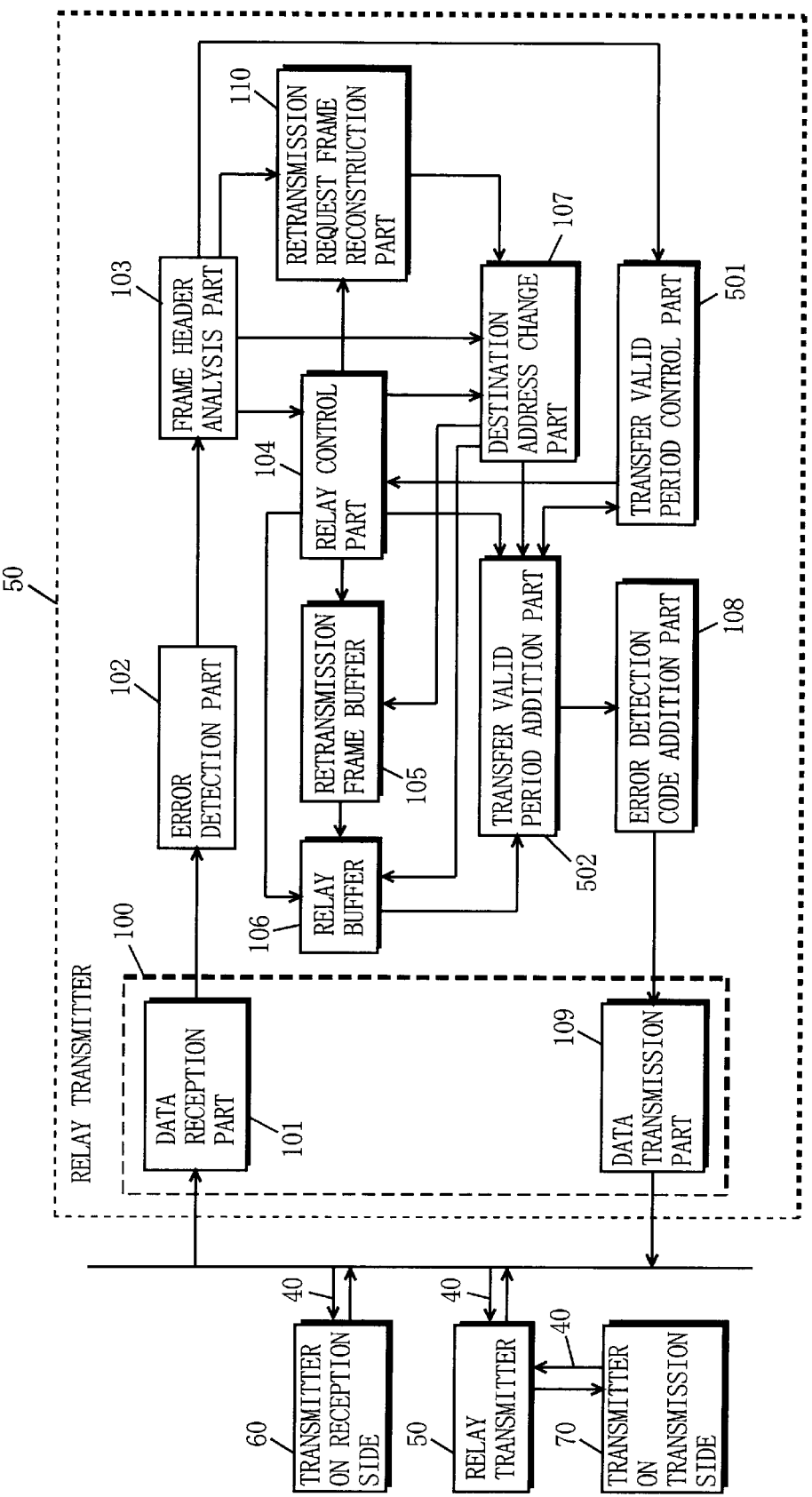
FIG. 5 is a block diagram showing the structure of a relay transmitter applying a relay transmission method according to a second embodiment of the present invention.
Figure 6:
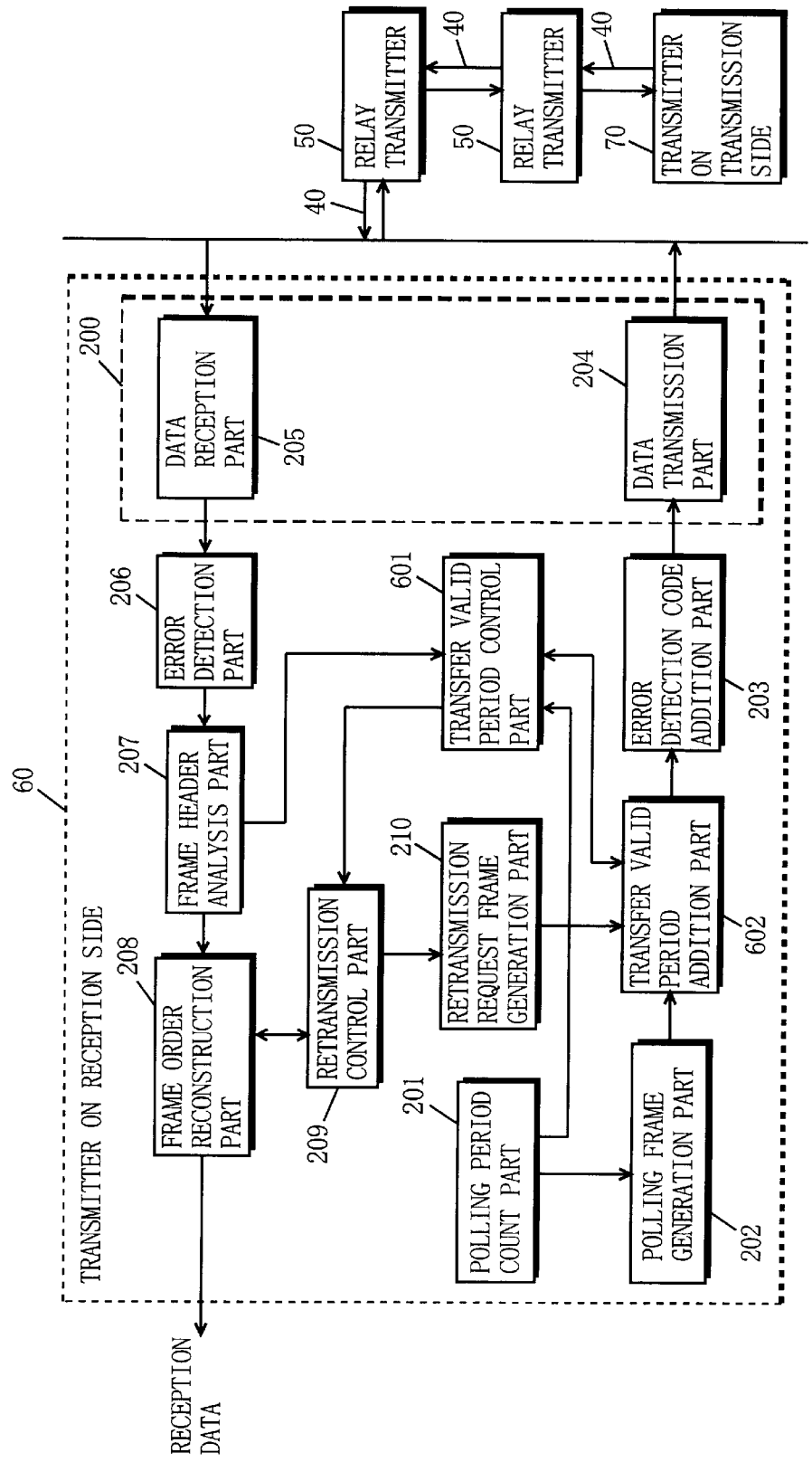
FIG. 6 is a block diagram showing the structure of a receiver applying the relay transmission method of the second embodiment.
Figure 7:
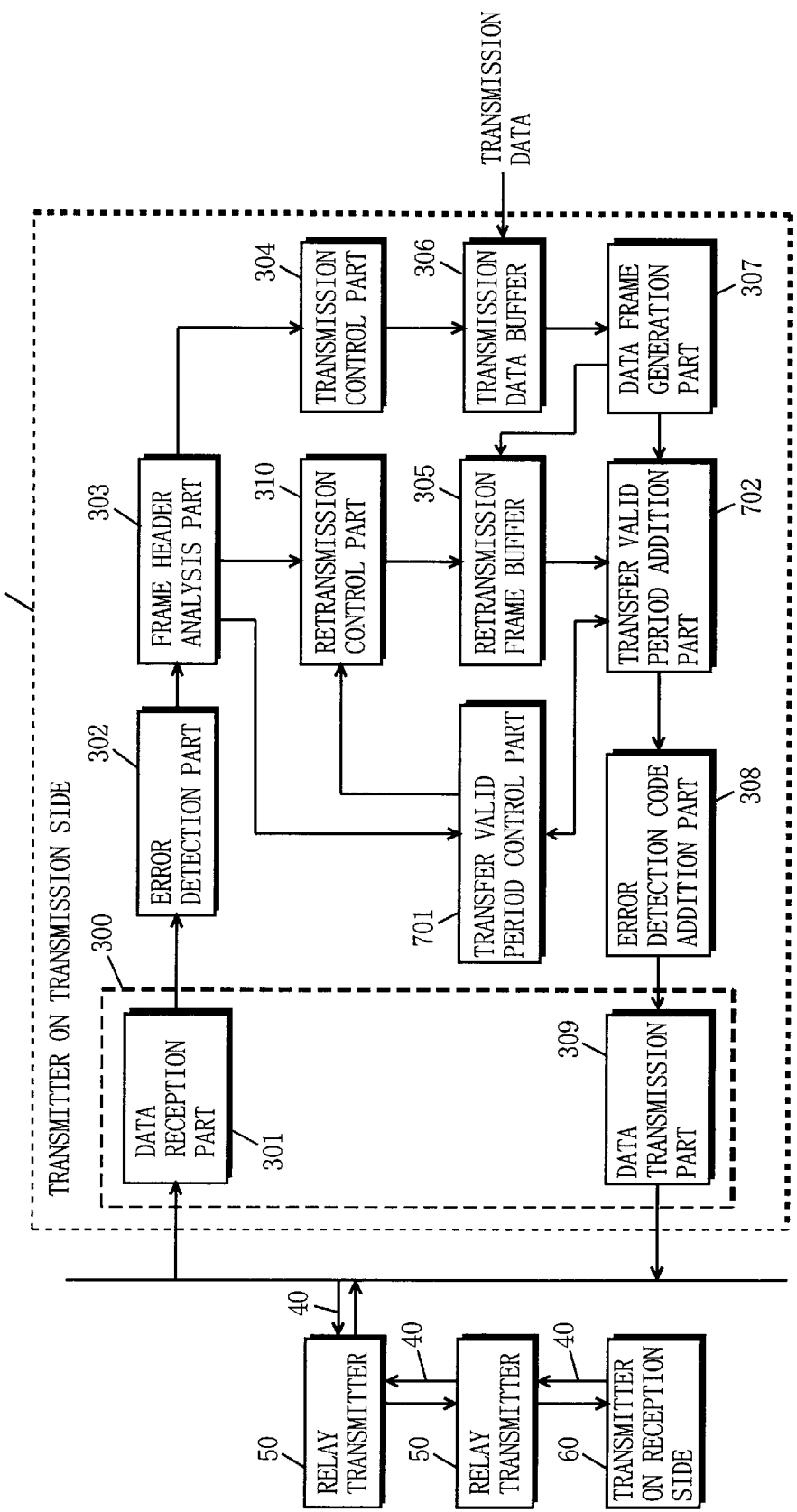
FIG. 7 is a block diagram showing the structure of a transmitter applying the relay transmission method of the second embodiment.

FIGS. 5 to 7 are diagrams showing the structure of a data transmission system according to a second embodiment of the present invention. Specifically, FIG. 5 shows the structure of a relay transmitter 50 located between transmitters on the transmission and reception sides 70 and 60 for increasing the distance for data transmission, FIG. 6 the structure of the transmitter on the reception side 60 for receiving data transmitted from the transmitter on the transmission side 70, and FIG. 7 the structure of the data transmitter on the transmission side 70. In these drawings, the transmitter on the reception side 60, transmitter on the transmission side 70, and relay transmitter 50 are connected to one another via transmission paths 40.

The data transmission system of the second embodiment is structurally almost similar to that of the first embodiment. Therefore, only the difference therebetween is described below.

In FIG. 5, the relay transmitter 50 is almost similar in structure to the relay transmitter 10 in FIG. 1, but additionally provided with a transfer valid period control part 501 and a transfer valid period addition part 502. Here, the transfer valid period control part 501 stores a transfer valid period, and decreases the period by 1 whenever a time taken for transmitting one transmission frame passes. As to the transfer valid period addition part 502, information on such transfer valid period is added to the transmission frame.

In FIG. 6, the transmitter on the reception side 60 is almost similar in structure to the transmitter on the reception side 20 in FIG. 2, but additionally provided with a transfer valid period control part 601 and a transfer valid period addition part 602. Here, the transfer valid period control part 601 stores a transfer valid period, and decreases the period by 1 whenever a time is taken for transmitting one frame. As to the transfer valid period addition part 602, information on such transfer valid period is added on the transmission frame.

In FIG. 7, the transmitter on the transmission side 70 is almost similar in structure to the transmitter on the transmission side 30 in FIG. 3, but additionally provided with a transfer valid period control part 701 and a transfer valid period addition part 702. Here, the transfer valid period control part 701 stores a transfer valid period, and decreases the period by 1 whenever a time is taken for transmitting one frame. As to the transfer valid period addition part 702, information on such transfer valid period is added on the transmission frame.

First, referring to FIG. 5, described next is the operation of the relay transmitter 50. In the relay transmitter 50, the data reception part 101 receives a transmission frame. The error detection part 102 determines whether the received transmission frame is normal. If any error is detected in the frame, the error detection part 102 discards the frame. Otherwise, the frame is analyzed for information by the frame header analysis part 103.

If the frame is analyzed as being addressed to its own terminal, the frame header analysis part 103 decreases a transfer valid period in the frame by 1, and then stores information on the transfer valid period in the transfer valid period control part 501. The frame header analysis part 103 also informs the relay control part 104 of the frame type of the analyzed.

If the informed frame type is a polling frame, the relay control part 104 clears the retransmission frame buffer 105 and the relay buffer 106. The relay control part 104 also brings the destination address change part 107 to rewrite the polling frame to address to the adjacent transmitter on the transmission side, and to output the frame to the transfer valid period addition part 502.

The transfer valid period addition part 502 adds, to the polling frame, the information on the transfer valid period stored in the transfer valid period control part 501. Then, the polling frame is also added with an error detection code by the error detection code addition part 108, and is transmitted out of the data transmission part 109.

If the informed frame type is a data frame, the relay control part 104 brings the destination address change part 107 to rewrite the data frame to address to the adjacent transmitter on the reception side. Also, the relay control part 104 brings the data frame to be accumulated in the retransmission frame buffer 105, while storing the data frame in the relay buffer 106.

Moreover, the relay control part 104 controls, if detected reception of a series of data frames having been completed, the data frames in the relay buffer 106 to be forwarded to the transfer valid period addition part 502, and after the control, clears the relay buffer 106.

The transfer valid period addition part 502 adds the transfer valid period decreased by 1 to each corresponding data frame. The transfer valid period is the one informed by the transfer valid period control part 501. Then, the data frames are also added each with an error detection code by the error detection code addition part 108, and are transmitted out of the data transmission part 109.

If the informed frame type is a retransmission request frame, the relay control part 104 clears the relay buffer 106. Then, the relay control part 104 determines whether the retransmission frame buffer 105 has a data frame requested for retransmission. If found, the data frame is stored in the relay buffer 106.

The relay control part 104 also informs the retransmission request frame reconstruction part 110 of a frame number(s) found in the retransmission frame buffer 105. The relay control part 104 controls the retransmission request frame reconstruction part 110 to remove, out of the retransmission request frame received from the frame header analysis part 103, any frame number(s) already stored in the retransmission frame buffer 105, and forwards the retransmission request frame to the destination address change part 107. There lay control part 104 brings the destination address change part 107 to rewrite the retransmission request frame to address to the transmitter on the transmission side, and then to output the frame to the transfer valid period addition part 502.

The transfer valid period addition part 502 adds, to the received retransmission request frame, the transfer valid period information informed by the transfer valid period control part 501. Then, the retransmission request frame is also added with an error detection code by the error detection code addition part 108, and is transmitted out of the data transmission part 109.

The transfer valid period control part 501 decreases the transfer valid period stored therein by 1 whenever a time taken to transmit one transmission frame passes. Here, when the transmission valid period becomes smaller than 0, the transfer valid period control part 501 informs the relay control part 104. The informed relay control part 104 then controls other parts to stop transmission of the transmission frame.

With reference to FIG. 6, described next is the operation of the transmitter on the reception side 60. In the transmitter on the reception side 60, the polling period count part 201 forwards a command of polling transmission at predetermined intervals to the polling frame generation part 202. The polling period count part 201 also stores information on transfer valid period in the transfer valid period control part 601. The information is a value obtained by dividing a polling period by a time taken to transmit one transmission frame. The transfer valid period control part 601 informs the transfer valid period addition part 602 of the stored information.

When receiving the command of polling transmission, the polling frame generation part 202 generates a polling frame addressed to the adjacent relay transmitter, and forwards the polling frame to the transfer valid period addition part 602. To the received polling frame, the transfer valid period addition part 602 then adds the transfer valid period information received from the transfer valid period control part 601. The polling frame then is additionally provided with an error detection code by the error detection code addition part 203, and is transmitted out of the data transmission part 204.

The data reception part 205 receives a transmission frame from the adjacent transmitter. The error detection part 206 determines whether the transmission frame is normal. If any error is detected in the frame, the error detection part 206 discards the frame. Otherwise, the frame is analyzed for information by the frame header analysis part 207.

If analyzed the frame as being a data frame addressed to its own terminal, the frame header analysis part 207 decreases a transfer valid period in the frame by 1, and stores information on the transfer valid period in the transfer valid period control part 601. The stored transfer valid period information is informed to the transfer valid period addition part 602. The frame header analysis part 207 then informs the retransmission control part 209 of the frame having arrived, and then accumulates the frame in the frame order reconstruction part 208.

The retransmission control part 209 then detects, after receiving a series of data, whether every data has been accumulated in the frame order reconstruction part 208. If every data frame is found therein, the retransmission control part 209 brings the frame order reconstruction part 208 to output data in order of frame number. Here, the output is reception data.

If any data frame has not yet reached the frame order reconstruction part 208, the retransmission control part 209 brings the retransmission request frame generation part 210 to generate a retransmission request frame including a frame number(s) of the not-yet-reached data frame(s), and to forward thus generated retransmission request frame to the transfer valid period addition part 602. The retransmission request frame is herein addressed to the adjacent relay transmitter.

To the retransmission request frame, the transfer valid period addition part 602 adds the transfer valid period information received from the transfer valid period control part 601. The retransmission request frame is then added with an error detection code by the error detection code addition part 203, and is transmitted out of the data transmission part 204.

The transfer valid period control part 601 decreases the transfer valid period stored therein by 1 whenever a time taken to transmit one transmission frame passes. Here, when the transfer valid period becomes smaller than 0, the transfer valid period control part 601 informs the retransmission control part 209. The retransmission control part 209 then controls other parts to stop transmission of the transmission frame.

With reference to FIG. 7, described next is the operation of the transmitter on the transmission side 70. In the transmitter on the transmission side 70, the data reception part 301 receives a transmission frame. The error detection part 302 determines whether the transmission frame is normal. If any error is detected in the frame, the error detection part 302 discards the frame. Otherwise, the frame is analyzed for information by the frame header analysis part 303.

If the analyzed frame determined as being a polling frame addressed to its own terminal, the frame header analysis part 303 decreases a transfer valid period in the frame by 1, and then stores information on the transfer valid period in the transfer valid period control part 701. The stored transfer valid period information is informed to the transfer valid period addition part 702. The frame header analysis part 303 also informs the transmission control part 304 of the polling frame having arrived.

The transmission control part 304 informed of the poling frame having arrived then clears the retransmission frame buffer 305, and reads data from the transmission data buffer 306 by the predetermined number of frames. There add at a is then sequentially provided with a frame number by the data frame generation part 307, thus the data is framed, and addressed to the adjacent relay transmitter. The transmission control part 304 stores the framed data in the retransmission frame buffer 305, and simultaneously forwards the framed data to the transfer valid period addition part 702.

The transfer valid period addition part 702 then adds the received transfer valid period information to the data frames. The data frames are then additionally each provided with an error detection code by an error detection code addition part 308, and transmitted out of a data transmission part 309.

If the analyzed frame is determined as being a retransmission request frame addressed to its own terminal, the frame header analysis part 303 decreases a transfer valid period in the frame by 1, and then stores information on the transfer valid period in the transfer valid period control part 701. The stored transfer valid period information is then informed to the transfer valid period addition part 702. The frame header analysis part 303 informs the retransmission control part 310 that the retransmission request frame has arrived.

After being informed of the retransmission request frame having arrived, a retransmission control part 310 extracts the frame number(s) in the received retransmission request frame. Thereafter, the retransmission control part 310 reads out the data frame(s) corresponding to the frame number(s) from the retransmission frame buffer 305 for output to the transfer valid period addition part 702.

To the retransmission request frame, the transfer valid period addition part 702 adds the transfer valid period information received from the transfer valid period control part 702. The retransmission request frame is then additionally provided with an error detection code by the error detection code addition part 308, and is transmitted out of the data transmission part 309.

The transfer valid period control part 701 decreases the transfer valid period information stored therein whenever a time taken to transmit one transmission frame passes. Here, when the transfer valid period information becomes smaller than 0, the transfer valid period control part 701 informs the retransmission control part 310. After being informed, the retransmission control part 310 controls other parts to stop transmission of the transmission frame.

Figure 8:
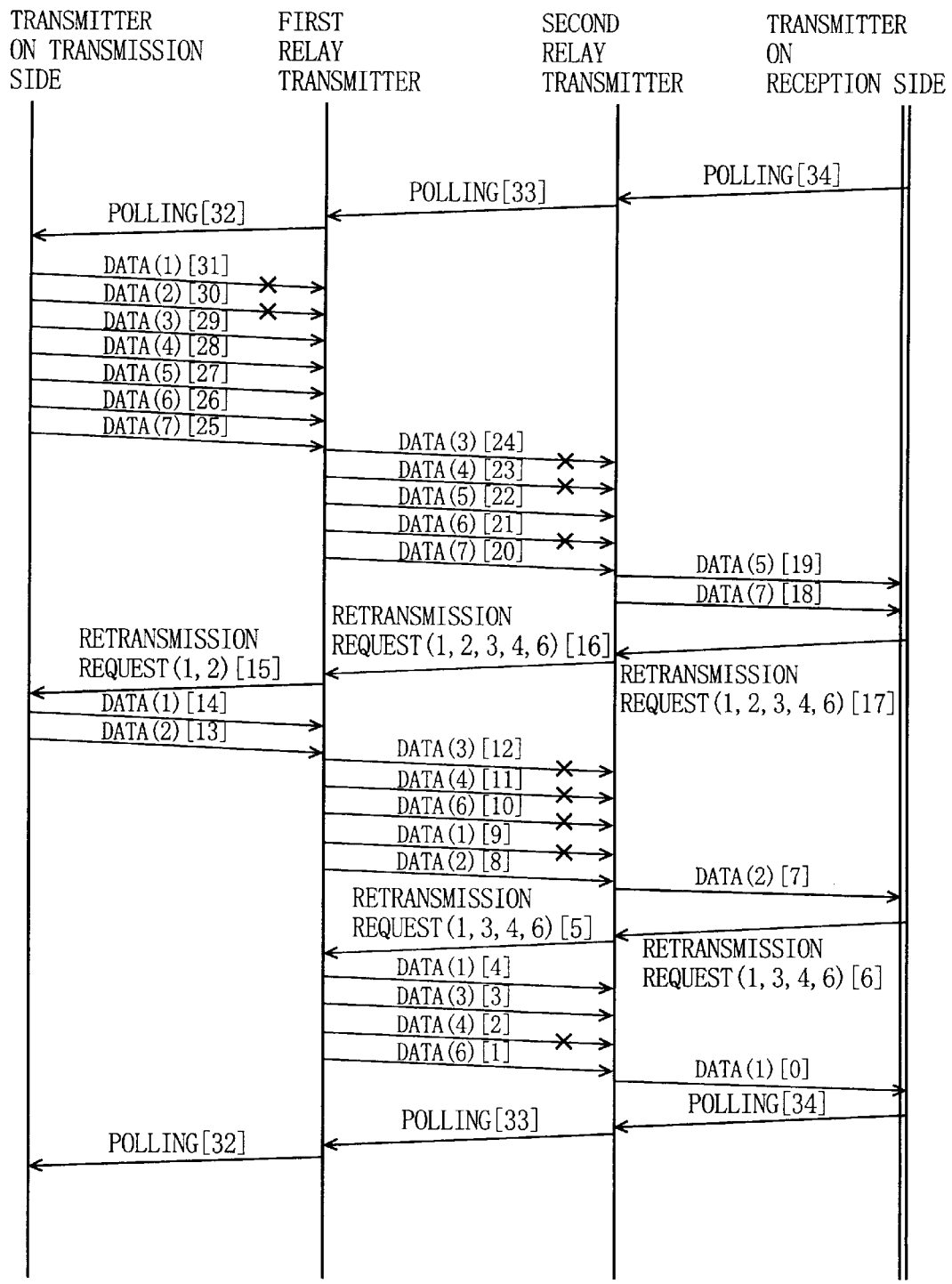
FIG. 8 is a diagram showing a sequence of the relay transmission method of the second embodiment.

FIG. 8 is a diagram showing a transfer sequence in the data transmission system of this embodiment. Therein, a first to a third data links are presumed to perform radio data transmission in the same frequency range. Also, presumably, a polling generated in the transmitter on the reception side in this system goes to a second relay transmitter and then a first before reaching the transmitter on the transmission side. Here, bracketed FIGS. such as (1) in the drawing denote frame numbers, while those such as [1] denote a transfer valid period. The transfer valid period is decreased by 1 whenever a transmission frame is relayed or transmitted.

First, once received the polling, the transmitter on the transmission side transmits 1st to 7th data frames to the first relay transmitter. Herein, a cross in the drawing shows that any error occurs in the data frame. The crossed 1st and 2nd data frames are discarded by the first relay transmitter.

The first relay transmitter stores the normally-received 3rd, 4th, 5th, 6th, and 7th data frames into its retransmission frame buffer, and simultaneously, transmits those to the second relay transmitter. The second relay transmitter then stores the normally-received 5th and 7th data frames into the retransmission frame buffer, and simultaneously, transmits those to the transmitter on the reception side.

The transmitter on the reception side stores the 5th and 7th data frames into the frame order reconstruction part. Then, an instruction is made by the retransmission control part to generate a retransmission request frame asking for retransmission of the missing data frames of 1st, 2nd, 3rd, 4th, and 6th. The generated retransmission request frame is transmitted to the second relay transmitter.

Here, the second relay transmitter does not have the 1st, 2nd, 3rd, 4th, and 6th data frames stored in its retransmission frame buffer. Therefore, the retransmission request frame is forwarded to the first relay transmitter without any change. The first relay transmitter has the 3rd, 4th, and 6th data frames stored in its retransmission frame buffer. Therefore, the 3rd, 4th, and 6th data frames are stored in the relay buffer. Thereafter, a retransmission request frame asking for retransmission of data frames of 1st and 2nd is generated, and is transmitted to the transmitter on the transmission side.

Responding to the request for retransmission, the transmitter on the transmission side transmits the 1st and 2nd data frames to the first relay transmitter. The first relay transmitter stores the 1st and 2nd data frames in its retransmission frame buffer, and simultaneously in the relay buffer. Then, the first relay transmitter transmits, to the second relay transmitter, the 1st and 2nd data frames together with the 3rd, 4th, and 6th data frames in the relay buffer. The second relay transmitter stores the normally-stored 2nd data frame in its retransmission frame buffer, and simultaneously transmits that to the transmitter on the reception side.

The transmitter on the reception side stores the normally-stored 2nd data frame in the frame order reconstruction part. Moreover, an instruction is made by the retransmission control part to generate a retransmission request frame asking for retransmission of the missing data frames of 1st, 3rd, 4th, and 6th. The generated retransmission request frame is transmitted to the second relay transmitter.

Here, the second relay transmitter does not have the 1st, 3rd, 4th, and 6th data frames stored in its retransmission frame buffer. Therefore, the retransmission request frame is forwarded to the first relay transmitter without any change.

The first relay transmitter has the 1st, 3rd, 4th, and 6th data frames stored in its retransmission frame buffer. Therefore, the 1st, 3rd, 4th, and 6th data frames are stored in the relay buffer. Herein, since every data frame requested for retransmission is found in the retransmission frame buffer, this is the end of transmission of the retransmission request frame. Thereafter, the 1st, 3rd, 4th, and 6th data frames are transmitted to the second relay transmitter.

The second relay transmitter stores the normally-received 1st, 3rd, and 6th data frames in its retransmission frame buffer, and simultaneously stores those in the relay buffer. Then, the 1st frame in the relay buffer is transmitted to the transmitter on the reception side. Here, this transmission result in the transfer valid period in the second relay transmitter being smaller than 0. Thus, this is the end of the transmission of the data frame. On the other hand, the transmitter on the reception side transmits another polling as a polling period has passed since the last polling frame's transmission.

As such, according to the data transmission system of the second embodiment, the transmission order of the transmission frames is sequentially passed among the transmitters, and then data transmission and retransmission are performed. Further, even if transmission takes time due to erroneous transmission, each of those transmitters can know when another polling comes next. Thanks to this, even in a case where transmission on a data link affects transmission on another data link as does in a radio transmission path, relay transmission can be done with no collision.

In this embodiment, the transfer valid period information is an integer, being a unit of time taken to transmit one transmission frame. However, this is not restrictive, and may be an actual time such as a second. If this is the case, the transfer valid period is not divided by 1 but by an actual time taken to transfer one transmission frame at the time when stored in the transfer valid period control part.

Further, in the data transmission system of this embodiment, a transmission path is presumably a radio transmission path. However, a wired transmission path on which the transmitters are connected in a bus shape is also a possibility. If this is the case, the data transmission system of this embodiment is also still effective in the same level.

Still further, the number of relay transmitters in the data transmission system of this embodiment is two, that is, two-stage relay transmission is taken as an example. However, this is not restrictive and may be M-stage relay transmission (M is a natural number) where the number of transmitters is M. If this is the case, the data transmission system of this embodiment is still effective in the same level.

Third Embodiment

Figure 9:
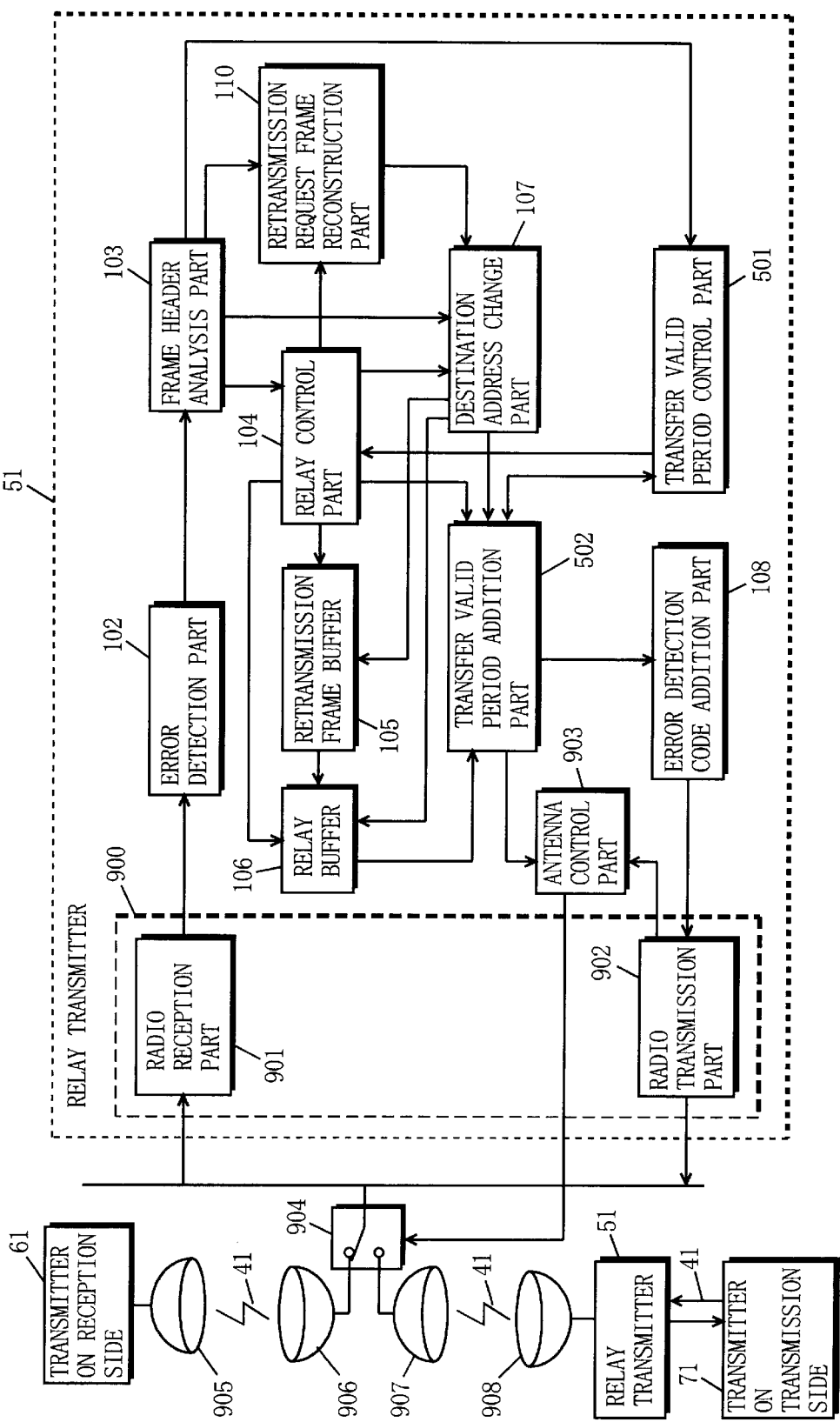
FIG. 9 is a block diagram showing the structure of a relay transmitter applying a relay transmission method according to a third embodiment of the present invention.
Figure 10:
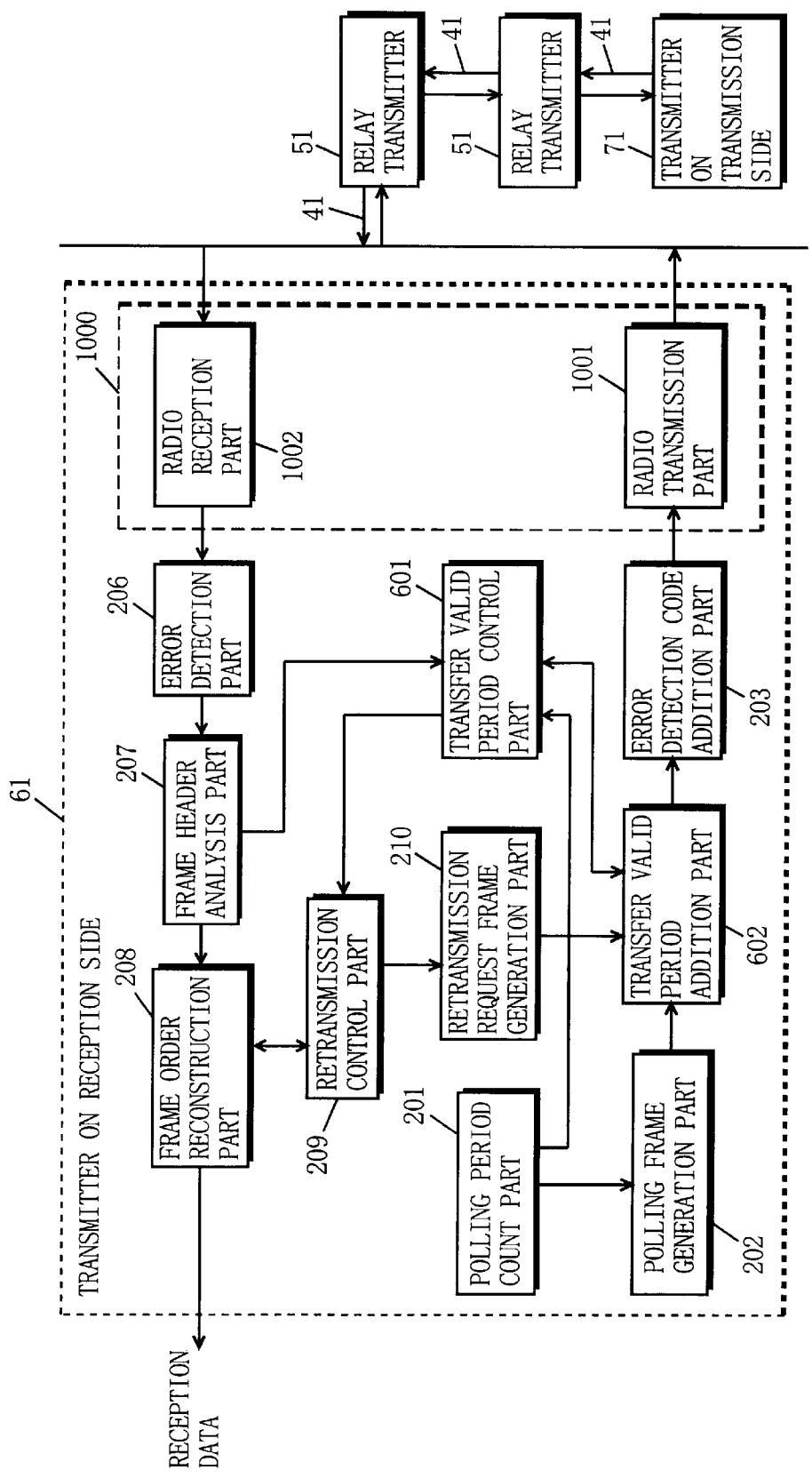
FIG. 10 is a block diagram showing the structure of a receiver applying the relay transmission method of the third embodiment.
Figure 11:
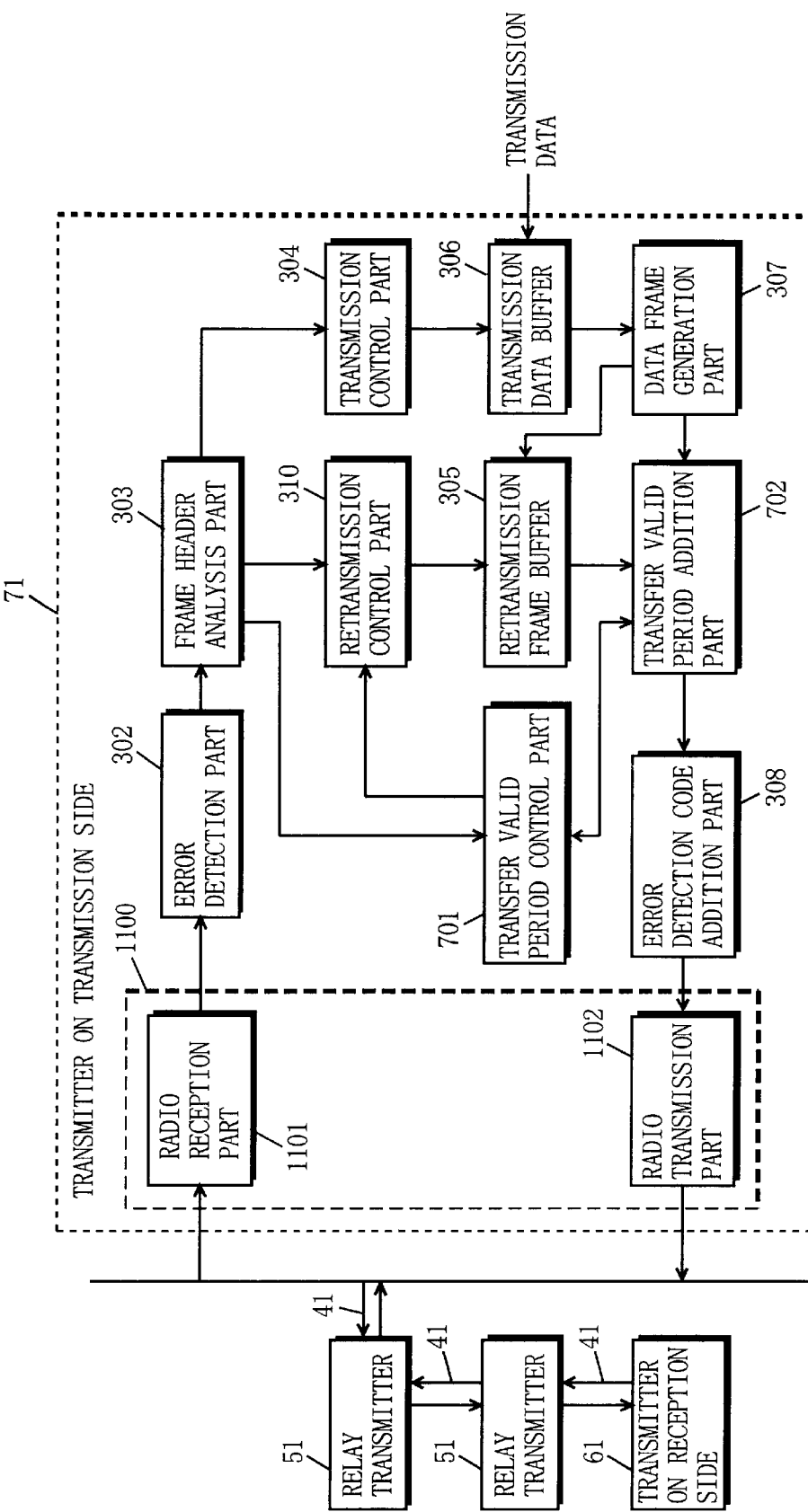
FIG. 11 is a block diagram showing the structure of a transmitter applying the relay transmission method of the third embodiment.

FIGS. 9 to 11 are diagrams showing the structure of a data transmission system according to a third embodiment of the present invention. The data transmission system of the third embodiment includes a transmission path 41 being a radio transmission path, a transmitter on the reception side 61 for receiving data by radio via the transmission path 41 for output, a transmitter on the transmission side 71 for transmitting data by radio to the transmitter on the reception side 61, and a relay transmitter 51 located between transmitters on the transmission and reception sides 71 and 61 for increasing the distance for data transmission. The data transmission system of the third embodiment is structurally almost similar to that of the second embodiment. Therefore, only the difference therebetween is described below.

Referring to FIG. 9, unlike the relay transmitter 50 in FIG. 5, the relay transmitter 51 does not include the data reception and transmission parts 105 and 109. Alternatively provided therein are a radio reception part 901 for demodulating a transmission wave on the transmission path 41 so as to generate a transmission frame including data frame, polling frame, retransmission request frame, and the like, and a radio transmission part 902 for modulating a data frame for send-out onto the transmission path as another transmission wave.

The radio reception and transmission parts 901 and 902 are typically in a single modem 900. Here, as described in the foregoing, there no need to put those in the same modem as long as simultaneous data transmission and reception is prevented.

The relay transmitter 51 further includes an antenna control part 903 which controls switching of a directional antenna according to information provided by the radio transmission part 902 and the transfer valid period addition part 502, an antenna switching part 904 for performing antenna switching under the control of the antenna control part 903, and directional antennas 906 and 907 of a type performing radio transmission/reception only in a specific direction. Here, a radio signal from the directional antennas 906 and 907 goes to directional antennas 905 and 908, respectively.

Referring to FIG. 10, unlike the transmitter on the reception side 60 in FIG. 6, the transmitter on the reception side 61 does not include the data reception and transmission parts 205 and 204. Alternatively provided therein are a radio reception part 1002 for demodulating a transmission wave on the transmission path 41 so as to generate a transmission frame including data frame, polling frame, retransmission request frame, and the like, and a radio transmission part 1001 for modulating a data frame for send-out onto the transmission path as another transmission wave.

The radio reception and transmission parts 1002 and 1001 are typically in a single modem 1000. Here, as described in the foregoing, there no need to put those in the same modem as long as simultaneous data transmission and reception is prevented.

Referring to FIG. 11, unlike the transmitter on the transmission side 70 in FIG. 7, the transmitter on the transmission side 71 does not include the data reception and transmission parts 301 and 309. Alternatively provided there in area radio reception part 1101 for demodulating a transmission wave on the transmission path 41 so as to generate a transmission frame including data frame, polling frame, retransmission request frame, and the like, and a radio transmission part 1102 for modulating a data frame for send-out onto the transmission path as another transmission wave.

The radio reception and transmission parts 1101 and 1102 are typically in a single modem 1100. Here, as described in the foregoing, there no need to put those in the same modem as long as simultaneous data transmission and reception is prevented.

Referring to FIG. 9, described next is the operation of the relay transmitter 51. In the relay transmitter 51, the radio reception part 901 receives a transmission frame. The error detection part 102 determines whether the received transmission frame is normal. If any error is detected in the frame, the error detection part 102 discards the frame. Otherwise, the frame is analyzed for information by the frame header analysis part 103.

If the frame is determined as being addressed to its own terminal, the frame header analysis part 103 decreases a transfer valid period stored therein by 1, and stores information on the transfer valid period in the transfer valid period control part 501. The frame header analysis part 103 informs the frame type of the analyzed to the relay control part 104.

If the informed frame type is a polling frame, the relay control part 104 clears the retransmission frame buffer 105 and the relay buffer 106. The relay control part 104 also brings the destination address change part 107 to rewrite the polling frame to address to the adjacent transmitter, and to out put to the transfer valid period addition part 502.

To the polling frame, the transfer valid period addition part 502 adds the transfer valid period information stored in the transfer valid period control part 501. The polling frame is then additionally provided with an error detection code by the error detection code addition part 108. The antenna control part 903 controls the antenna switching part 904 to select an antenna adjusted in the direction where the transmitter for transmitting the frame is located. Under such control, the antenna switching part 904 performs antenna switching. Thereafter, the radio transmission part 902 transmits the polling frame.

Herein, the antenna control part 903 internally has a timer, which timeouts once the transfer valid period provided by the transfer valid period addition part 502 passed. When the timer timeouts, the antenna control part 903 controls the antenna switching part 904 so that the antenna is adjusted back to the direction where the transmitter on the reception side is located. Under such control, the antenna switching part 904 performs antenna switching.

If the informed frame type is a data frame, the relay control part 104 brings the destination address part 107 to rewrite the data frame to address to the transmitter on the reception side. Then, the relay control part 104 accumulates the data frame in the retransmission frame buffer 105, while storing the data frame in the relay buffer 106.

The relay control part 104 also controls, if detected reception of a series of data frames having been completed, the data frames in the relay buffer 106 to be forwarded to the transfer valid period addition part 502. After completion of such control, the relay buffer 106 is cleared.

The transfer valid period addition part 502 adds the transfer valid period decreased by 1 to each corresponding data frame. The transfer valid period is the one informed by the transfer valid period control part 501. Then, the data frames are also added each with an error detection code by the error detection code addition part 108. The antenna control part 903 controls the antenna switching part 904 to select an antenna adjusted in the direction where the transmitter for transmitting the frame is located. Under such control, the antenna switching part 904 performs antenna switching. Thereafter, the radio transmission part 902 transmits the data frame.

The antenna control part 903 has, as already described, the timer which timeouts once the transfer valid period passed. When the timer timeouts, the antenna control part 903 controls the antenna switching part 904 so that the antenna is adjusted back to the direction where the transmitter on the reception side is located. Under such control, the antenna switching part 904 performs antenna switching.

If the informed frame type is a retransmission request frame, the relay control part 104 clears the relay buffer 106, and checks whether a data frame(s) requested for retransmission is found in the retransmission frame buffer 105. If found, the data frame(s) is stored in the relay buffer 106.

The relay control part 104 also informs the retransmission request frame reconstruction part 110 of the data frame(s) by frame number found in the retransmission frame buffer 105. The relay control part 104 controls the retransmission request frame reconstruction part 110 to remove, out of the retransmission request frame, any frame number(s) already stored in the retransmission frame buffer 105, and forwards the retransmission request frame to the destination address change part 107. The relay control part 104 controls the destination address change part 107 to rewrite the retransmission request frame to address to the transmitter on the transmission side, and then to output the frame to the transfer valid period addition part 502.

To the retransmission request frame, the transfer valid period addition part 502 adds the transfer valid period information provided by the transfer valid period control part 501. The retransmission request frame is then additionally provided with an error detection code by the error detection code addition part 108. The antenna control part 903 controls the antenna switching part 904 to select an antenna adjusted in the direction where the transmitter for transmitting the frame is located. Under such control, the antenna switching part 904 performs antenna switching. Thereafter, the radio transmission part 902 transmits the polling frame.

The antenna control part 903 internally has, as already described, the timer which timeouts once the transfer valid period passed. When the timer timeouts, the antenna control part 903 controls the antenna switching part 904 so that the antenna is adjusted back to the direction where the transmitter on the reception side is located. Under such control, the antenna switching part 904 performs antenna switching.

The transfer valid period control part 501 decreases the transfer valid period stored therein by 1 whenever a time taken to transmit one transmission frame passes. Here, when the transmission valid period becomes smaller than 0, the transfer valid period control part 501 informs the relay control part 104. The informed relay control part 104 then controls other parts to stop transmission of the transmission frame.

With reference to FIG. 10, described next is the operation of the transmitter on the reception side 61. In the transmitter on the reception side 61, the polling period count part 201 forwards a command of polling transmission at predetermined intervals to the polling frame generation part 202. The polling period count part 201 also stores, in the transfer valid period control part 601 as the transfer valid period information, a value obtained by dividing the polling period by a time taken to transmit one transmission frame.

When receiving the command of polling transmission, the polling frame generation part 202 generates a polling frame addressed to the adjacent relay transmitter, and forwards the polling frame to the transfer valid period addition part 602. To the received polling frame, the transfer valid period addition part 602 then adds the transfer valid period information received from the transfer valid period control part 601. The polling frame then is additionally provided with an error detection code by the error detection code addition part 203, and is transmitted out of the radio transmission part 1001.

The radio reception part 1002 receives a transmission frame. The received transmission frame is determined as being normal or not by the error detection part 206. If any error is detected in the frame, the error detection part 206 discards the frame. Otherwise, the frame is analyzed for information by the frame header analysis part 207.

If the frame is analyzed as being a data frame addressed to its own terminal, the frame header analysis part 207 decreases a transfer valid period in the frame by 1, and then stores information on the transfer valid period in the transfer valid period control part 601. The frame header analysis part 207 also informs the retransmission control part 209 that the frame has arrived, and the frame is accumulated in the frame order reconstruction part 208.

The retransmission control part 209 then detects, after receiving a series of data, whether every data frame has been accumulated in the frame order reconstruction part 208. If every data frame is found therein, the retransmission control part 209 brings the frame order reconstruction part 208 to output the accumulated data frames in order of frame number. Here, the output is reception data.

If any data frame has not yet reached the frame order reconstruction part 208, the retransmission control part 209 brings the retransmission request frame generation part 210 to generate a retransmission request frame including a frame number(s) of the not-yet-reached data frame(s), and to output thus generated retransmission request to the transfer valid period addition part 602. Here, the generated retransmission request frame is addressed to the adjacent relay transmitter.

To the retransmission request frame, the transfer valid period addition part 602 adds the transfer valid period information stored in the transfer valid period control part 601. The retransmission request frame is then added with an error detection code by the error detection code addition part 203, and is transmitted out of the radio transmission part 1001.

The transfer valid period control part 601 decreases the transfer valid period stored therein by 1 whenever a time taken to transmit one transmission frame passes. Here, when the transfer valid period becomes smaller than 0, the transfer valid period control part 601 informs the retransmission control part 209. The informed retransmission control part 209 then controls other parts to stop transmission of the transmission frame.

With reference to FIG. 11, described next is the operation of the transmitter on the transmission side 71. In the transmitter on the transmission side 71, the radio reception part 1101 receives a transmission frame. The error detection part 302 determines whether the transmission frame is normal. If any error is detected in the frame, the error detection part 302 discards the frame. Otherwise, the frame is analyzed for information by the frame header analysis part 303.

If the frame is analyzed as being a polling frame addressed to its own terminal, the frame header analysis part 303 decreases a transfer valid period in the frame by 1, and stores information on the transfer valid period in the transfer valid period control part 701. The frame header analysis part 303 then informs the transmission control part 304 of the polling frame having arrived.

After being informed of the polling frame having arrived, the transmission control part 304 clears the retransmission frame buffer 305, and then reads the transmission data buffer 306 for only by the predetermined number of frames. The read data is then sequentially provided with a frame number by the data frame generation part 307, thus the data is framed, and addressed to the adjacent relay transmitter. The transmission control part 304 stores the framed data in the retransmission frame buffer 305, and simultaneously forwards the framed data to the transfer valid period addition part 702.

The transfer valid period addition part 702 then adds the received transfer valid period information to the data frames.

The data frames are then additionally each provided with an error detection code by the error detection code addition part 308, and transmitted out of the radio transmission part 1102.

If the analyzed frame is determined as being a retransmission request frame addressed to its own terminal, the frame header analysis part 303 decreases a transfer valid period in the frame by 1, and then stores the information in the transfer valid period control part 701. The frame header analysis part 303 also informs the relay control part 310 that the retransmission request frame has arrived.

The retransmission control part 310 extracts the frame number(s) in the received retransmission request frame, and then reads out the data frame(s) corresponding to the frame number(s) from the retransmission frame buffer 305 for output to the transfer valid period addition part 702.

Then, the data frames are also added each with the transfer valid period information stored in the transfer valid period control part 701 by the transfer valid period addition part 702. The data frames are then additionally each provided with an error detection code by the error detection code addition part 308, and are transmitted out of the radio transmission part 1102.

The transfer valid period control part 701 decreases the transfer valid period stored therein by 1 whenever a time taken to transmit one transmission frame passes. Here, when the transmission valid period becomes smaller than 0, the transfer valid period control part 701 informs the retransmission control part 310. The informed retransmission control part 310 then controls other parts to stop transmission of the transmission frame.

Figure 12:
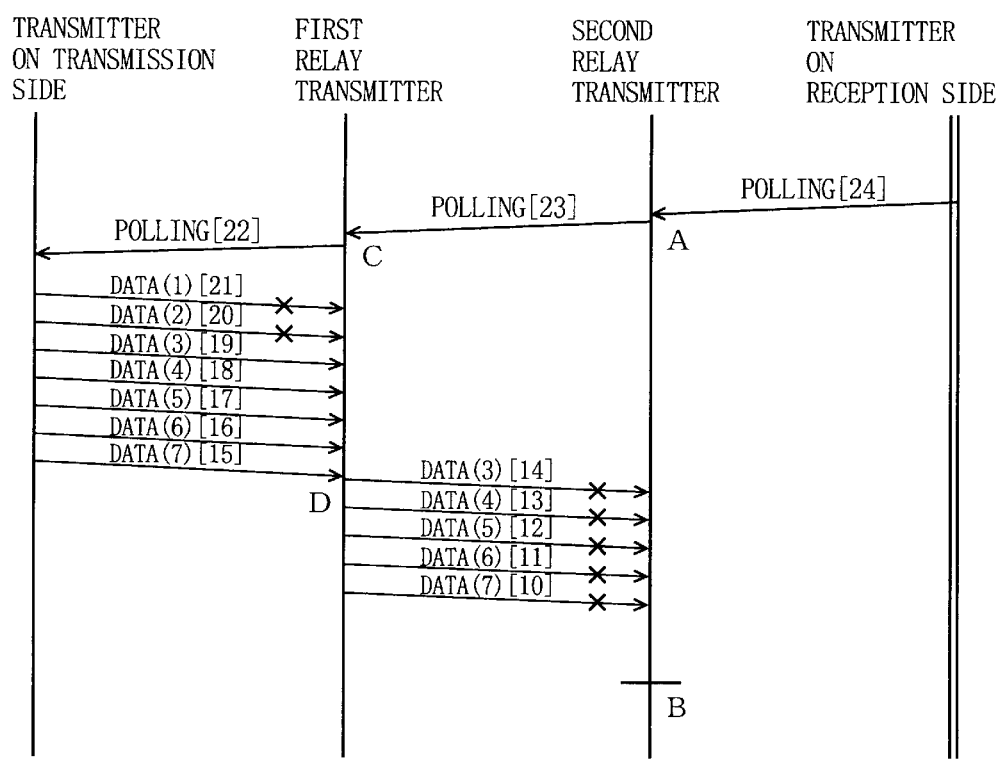
FIG. 12 is a diagram showing a sequence of the relay transmission method of the third embodiment.

FIG. 12 is a diagram showing a transfer sequence in the data transmission system of this embodiment. Therein, a first to a third data links are presumed to perform radio data transmission in the same frequency range. Also, presumably, in an initial state, antennas provided to the first and second relay transmitters are both adjusted in a direction where the transmitter on the reception side is located. Here, bracketed figures such as (1) in the drawing denote frame numbers, while those such as [1] denote a transfer valid period. The transfer valid period is decreased by 1 whenever a transmission frame is relayed or transmitted.

In FIG. 12, a polling generated in the transmitter on the reception side goes to the second relay transmitter, and then the first, before reaching the transmitter on the transmission side. Once received the polling, the first and second relay transmitters activate timers Ta1 and Ta2, respectively, based on transfer valid period information included in the polling. Those timers Ta1 and Ta2 are respectively provided in an antenna control part of the first and second relay transmitters, and timeout after the transfer valid period passed. After the reception is complete, the antenna control parts each switch the directional antenna so as to direct in a direction where the transmitter on the transmission side is located. The switching timing is indicated by A and C in the drawing. By switching and keeping the direction of the antennas in such manner, the first and second relay transmitters can be prepared for any data frame transmitted from the transmitter on the transmission side.

Once received the polling, the transmitter on the transmission side transmits 1st to 7th data frames to the first relay transmitter. Herein, a cross in the drawing shows that any error occurs in the data frame. The crossed data frame is discarded by the first relay transmitter.

The first relay transmitter stores the normally-received 3rd, 4th, 5th, 6th, and 7th data frames into its retransmission frame buffer, and simultaneously, transmits those to the second relay transmitter. At this time, in the antenna control part therein, the timer Ta1 is reset, and thus the antenna is adjusted back to the direction where the transmitter on the reception side is located. This timing is indicated by D in the drawing. Herein, the timer Ta1 may be structured to update the transfer valid period information whenever another comes.

Next, every data frame provided by the first relay transmitter is found erroneous. Thus, the second relay transmitter discards those. As the second relay transmitter has no data frame received, the antenna is adjusted back to the direction where the transmitter on the reception side is located when the timer Ta2 timeouts. The timing is indicated by B in the drawing.

According to the data transmission system of this embodiment, even in a case where the frame transmission is completely interrupted due to erroneous transmission on the transmission path, the antennas can be precisely adjusted by using the timer in the antenna control part 903. Typically, the antenna in the respective relay transmitters is adjusted back to the transmitter on the reception side, without fail, when a new polling comes, therefore reception of the polling frame is assuredly done.

Herein, in the data transmission system of this embodiment, the antenna switching part 904 performs antenna switching with respect to two directional antennas of 906 and 907. However, the number of the directional antenna may be only 1, and the antenna control part 903 may direct the antenna. Typically, the antenna control part 903 rotates the antenna so as to change its direction. Further, the antenna may be an adaptive array antenna, and the antenna control part 903 may weigh differently a signal coming from each antenna device to change its direction.

In this embodiment, the transfer valid period information is an integer, being a unit of time taken to transmit one transmission frame. However, this is not restrictive, and may be an actual time such as a second. If this is the case, the transfer valid period is not divided by 1 but by an actual time taken to transfer one transmission frame at the time when stored in the transfer valid period control part.

Still further, the number of relay transmitters in the data transmission system of this embodiment is two, that is, two-stage relay transmission is taken as an example. However, this is not restrictive and may be M-stage relay transmission (M is a natural number) where the number of transmitters is M. If this is the case, the data transmission system of this embodiment is still effective in the same level.

Fourth Embodiment

Figure 13:
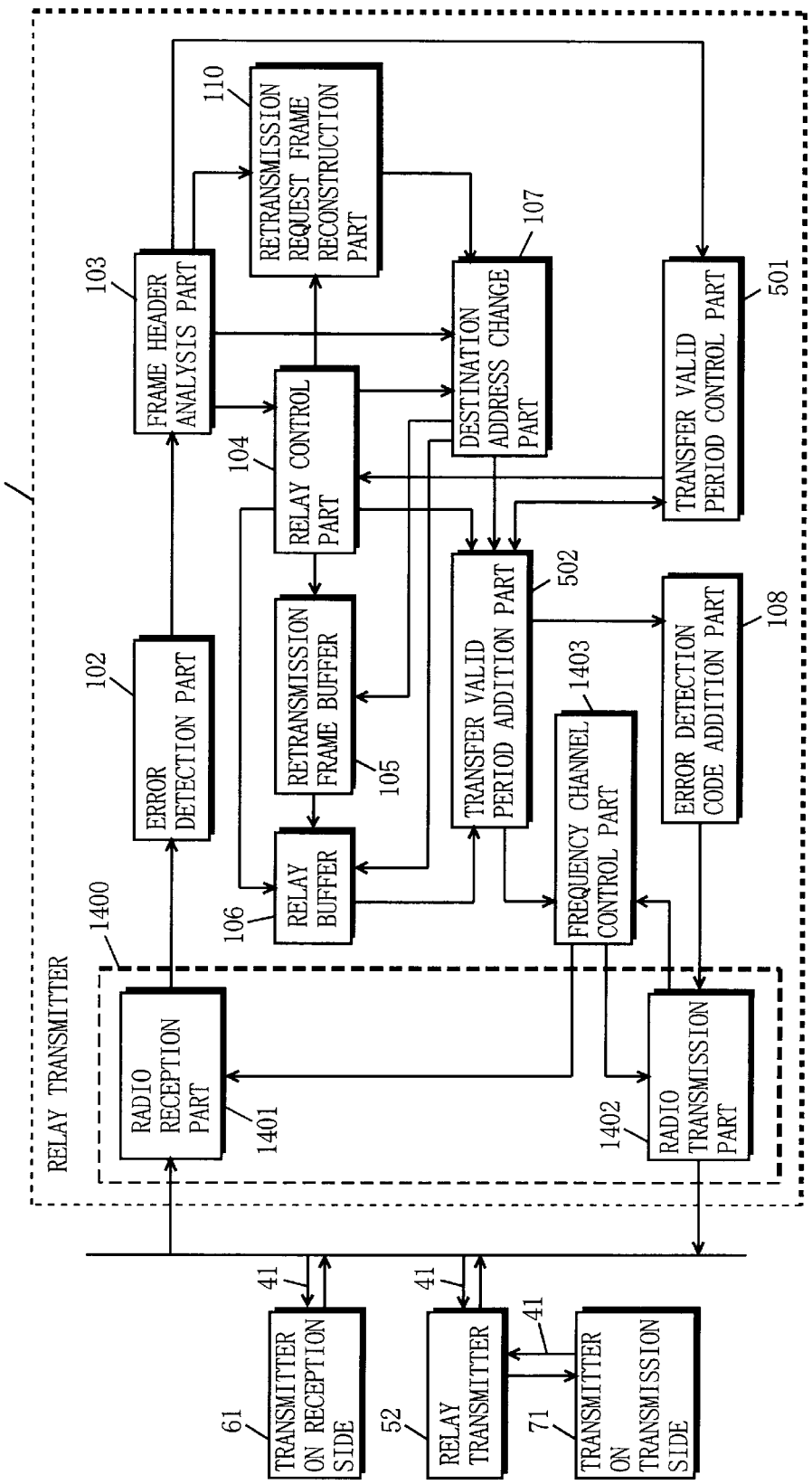
FIG. 13 is a block diagram showing the structure of a relay transmitter applying a relay transmission method according to a fourth embodiment of the present invention.

FIG. 13 is a diagram showing the structure of a data transmission system according to a fourth embodiment of the present invention. The data transmission system of the fourth embodiment includes the transmission path 41 being a radio transmission path, the transmitter on the reception side 61 for receiving data by radio via the transmission path 41 for output, the transmitter on the transmission side 71 for transmitting data by radio to the transmitter on the reception side 61, and a relay transmitter 52 located between transmitters on the transmission and reception sides 71 and 61 for increasing the distance for data transmission. The data transmission system of the third embodiment is structurally almost similar to that of the third embodiment. Therefore, only the difference therebetween is described below.

Referring to FIG. 13, unlike the relay transmitter 51 in FIG. 9, the relay transmitter 52 includes a radio reception part 1401 capable of switching among several frequency channels, and a radio transmission part 1402. The radio reception and transmission parts 1401 and 1402 are typically in the single modem 1400. Here, as described in the foregoing, there no need to put those in the same modem as long as simultaneous data transmission and reception is prevented. The relay transmitter 52 further includes a frequency channel control part 1403 for controlling switching of frequency channels according to information provided by the radio transmission part 1402 and the transfer valid period addition part 502. Here, the transmitter on the reception side 61 is structurally identical to that in FIG. 10, and the transmitter on the transmission side 71 to that in FIG. 11.

Referring to FIG. 13, described next is the operation of the relay transmitter 52. In the relay transmitter 52, the data reception part 1401 receives a transmission frame. The error detection part 102 determines whether the received transmission frame is normal. If any error is detected in the frame, the error detection part 102 discards the frame. Otherwise, the frame is analyzed for information by the frame header analysis part 103.

If the frame is determined as being addressed to its own terminal, the frame header analysis part 103 decreases a transfer valid period in the frame by 1, and then stores information on the transfer valid period in the transfer valid period control part 501. The frame header analysis part 103 also informs the relay control part 104 of the frame type of the analyzed.

If the informed frame type is a polling frame, the relay control part 104 clears the retransmission frame buffer 105 and the relay buffer 106. The relay control part 104 also brings the destination address change part 107 to rewrite the polling frame to address to the adjacent transmitter on the transmission side, and to output the frame to the transfer valid period addition part 502.

The transfer valid period addition part 502 adds, to the polling frame, the information on the transfer valid period stored in the transfer valid period control part 501. Then, the polling frame is also added with an error detection code by the error detection code addition part 108. The frequency channel control part 1403 controls the radio reception and transmission parts 1401 and 1402 to be in a frequency channel for communications with the adjacent transmitter on the transmission side. Then, the radio transmission part 1402 transmits the polling frame.

Herein, the frequency channel control part 1403 internally has a timer, which timeouts once the transfer valid period received from the transfer valid period addition part 502 passed. When the timer timeouts, the frequency channel control part 1403 controls the radio reception and transmission parts 1401 and 1402 so as to be again in a frequency channel used for communications with the transmitter on the reception side.

If the informed frame type is a data frame, the relay control part 104 brings the destination address change part 107 to rewrite the data frame to address to the adjacent transmitter on the reception side. Also, the relay control part 104 accumulates the data frame in the retransmission frame buffer 105, while storing the data frame in the relay buffer 106.

Moreover, the relay control part 104 controls, if detected reception of a series of data frames having been completed, the data frames in the relay buffer 106 to be forwarded to the transfer valid period addition part 502, and after the control, clears the relay buffer 106.

The transfer valid period addition part 502 adds the transfer valid period decreased by 1 to each corresponding data frame. Then, the data frames are also each added with an error detection code by the error detection code addition part 108. The frequency channel control part 1403 sets the radio reception and transmission parts 1401 and 1402 so as to be in a frequency channel for communications with the transmitter on the transmission side, which transmits the frames. Then, the radio transmission part 1402 transmits the data frames.

Herein, as already described, the frequency channel control part 1403 internally has the timer, which timeouts once the transfer valid period passed. When the timer timeouts, the frequency channel control part 1403 controls the radio reception and transmission parts 1401 and 1402 to be again in a frequency channel used in communications with the transmitter on the reception side.

If the informed frame type is a retransmission request frame, the relay control part 104 clears the relay buffer 106. Then, the relay control part 104 determines whether the retransmission frame buffer 105 has a data frame requested for retransmission. If found, the data frame is stored in the relay buffer 106.

The relay control part 104 also informs the retransmission request frame reconstruction part 110 of a frame number(s) found in the retransmission frame buffer 105. The relay control part 104 controls the retransmission request frame reconstruction part 110 to remove, out of the retransmission request frame received from the frame header analysis part 103, any frame number(s) already stored in the retransmission frame buffer 105, and forwards the retransmission request frame to the destination address change part 107. There lay control part 104 brings the destination address change part 107 to rewrite the retransmission request frame to address to the transmitter on the transmission side, and then to output the frame to the transfer valid period addition part 502.

The transfer valid period addition part 502 adds, to the received retransmission request frame, the transfer valid period information informed by the transfer valid period control part 501. Then, the retransmission request frame is also added with an error detection code by the error detection code addition part 108. The frequency channel control part 1403 controls the radio reception and transmission parts 1401 and 1402 to be in a frequency channel for communications with the transmitter on the transmission side, which transmits the frame. Then, the radio transmission part 1402 transmits the retransmission request frame.

Herein, as described in the foregoing, the frequency channel control part 1403 internally has the timer, which timeouts once the transfer valid period passed. When the timer timeouts, the frequency channel control part 1403 controls the radio reception and transmission parts 1401 and 1402 to be again in a frequency channel used for communications with the transmitter on the reception side.

The transfer valid period control part 501 decreases the transfer valid period stored therein by 1 whenever a time taken to transmit one transmission frame passes. Here, when the transmission valid period becomes smaller than 0, the transfer valid period control part 501 informs the relay control part 104. The informed relay control part 104 then controls other parts to stop transmission of the transmission frame.

Herein, the transmitters on the reception and transmission sides 61 and 71 both operate in the same manner as in the third embodiment, and therefore is not described again.

Figure 14:
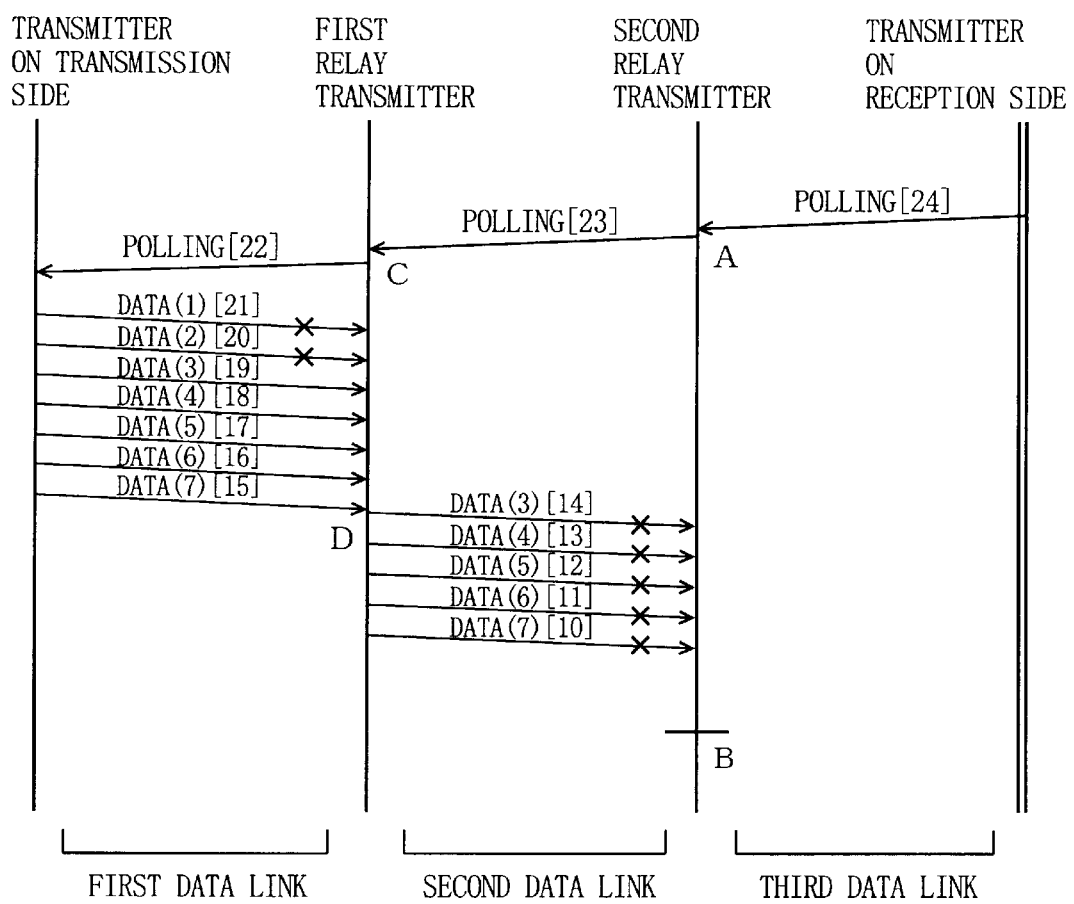
FIG. 14 is a diagram showing a sequence of the relay transmission method of the fourth embodiment.
Figure 15:
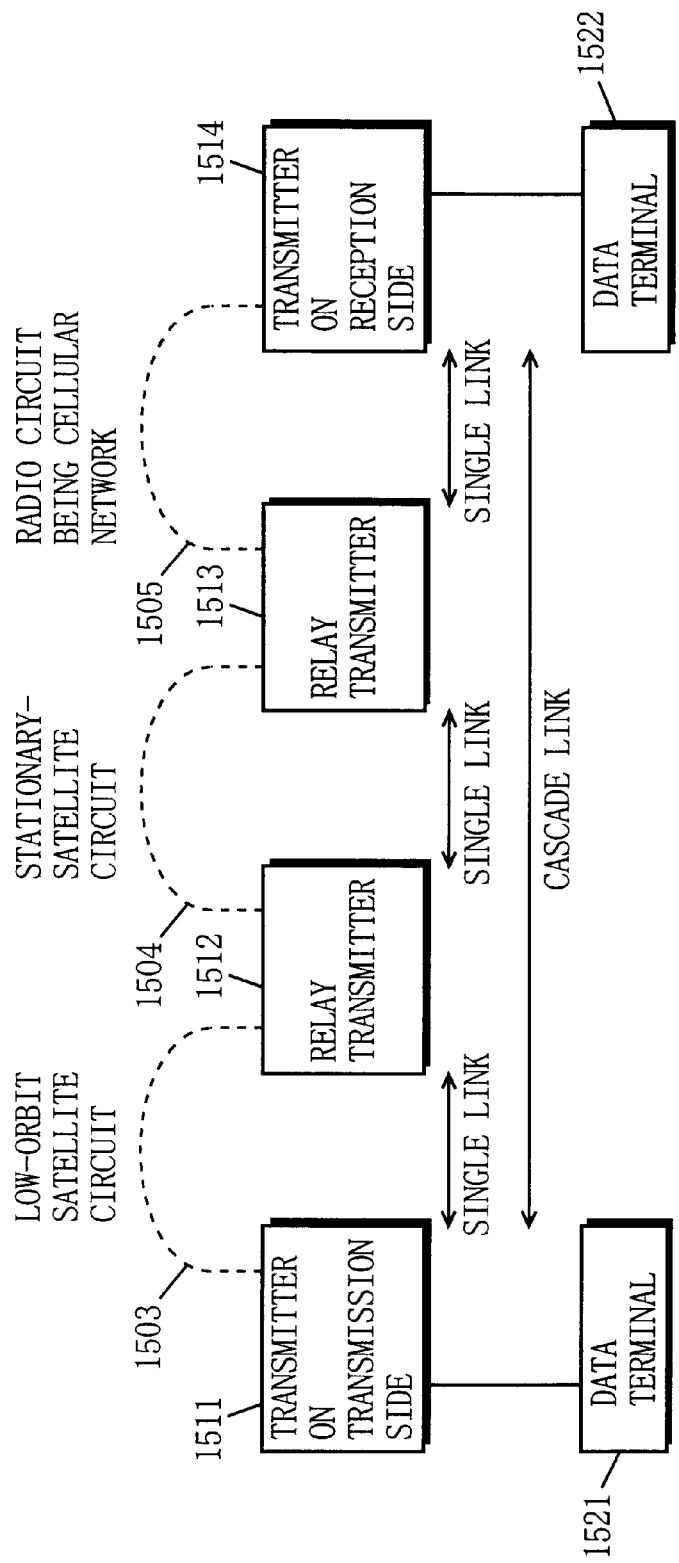
FIG. 15 is a block diagram showing the structure of a conventional relay transmission system.

FIG. 14 is a diagram showing a transfer sequence in the data transmission system of this embodiment. Therein, data links are presumed to perform radio data transmission in each different frequency range, i.e., a first data link in channel 1, a second data link in channel 2, and a third data link in channel 3. This is typically done to prevent those data links from sharing the same frequency range as disturbance waves emitted from a wave source (e.g., microwave oven). Such disturbance waves disturb radio data transmission.

Assumed herein is that a wave source emitting a disturbance wave in the same frequency range as the channel 3 is in the vicinity of the first relay transmitter. In such case, the first relay transmitter may have some difficulties to receive waves from the second relay transmitter or the transmitter on the transmission side with the channel 3. This is because, a disturbance wave emitted by a neighboring wave source generally intense but a wave coming from the transmitters being weak because it has traveled across a long distance. Therefore, such a disturbance wave is quite likely to disturb data reception. Similarly, if a wave source emitting a disturbance wave in the same frequency range as the channel 1 is in the vicinity of the second relay transmitter, the second relay transmitter may have some difficulties receiving waves from the first relay transmitter or the transmitter on the reception side with the channel 1. If this is the case, setting the frequency channels for the data links as in FIG. 14 is a solution. With such setting, signal reception among transmitters can be satisfactorily done without being disturbed by the disturbance waves from the source.

In FIG. 14, in the initial state, the channel of the first relay transmitter is presumably in channel 2, and that of the second relay transmitter is in channel 3. Here, bracketed figures such as (1) in the drawing denote frame numbers, while those such as [1] denote a transfer valid period. The transfer valid period is decreased by 1 whenever a transmission frame is relayed or transmitted.

In FIG. 14, a polling generated in the transmitter on the reception side goes to the second relay transmitter, and then the first, before reaching the transmitter on the transmission side. Once received the polling, the first and second relay transmitters activate the timers Ta1 and Ta2, respectively, based on transfer valid period information included in the polling. Those timers Ta1 and Ta2 are respectively provided in an frequency control part of the first and second relay transmitters, and timeout after the transfer valid period passed.

After the reception is complete, the frequency control part in the first relay transmitter switches its channel to channel 1, and the frequency control part in the second relay transmitter switches its channel to channel 2. The switching timing is indicated by A and C in the drawing. By switching and keeping the channels in such manner, the first and second relay transmitters can be prepared for any data frame transmitted from the transmitter on the transmission side.

Once received the polling, the transmitter on the transmission side transmits 1st to 7th data frames to the first relay transmitter. Herein, a cross in the drawing shows that any error occurs in the data frame. The crossed data frame is discarded by the first relay transmitter.

The first relay transmitter stores the normally-received 3rd, 4th, 5th, 6th, and 7th data frames into its retransmission frame buffer, and simultaneously, transmits those to the second relay transmitter. At this time, in the frequency control part therein, the timer Ta1 is reset, and thus the channel is put back to channel 2. This timing is indicated by B in the drawing. Herein, the timer Ta1 may be structured not to be reset, and update the transfer valid period information whenever another comes.

Next, every data frame provided by the first relay transmitter is found erroneous. Thus, the second relay transmitter discards those. As the second relay transmitter has no data frame received, the channel is put back to channel 3 when the timer Ta2 timeouts. The timing is indicated by B in the drawing.

According to the data transmission system of the fourth embodiment, even in a case where the frame transmission is completely interrupted due to erroneous transmission on the transmission path, for example, the channels can be precisely controlled by using the timer in the frequency control part 1403. Typically, the channel in the respective relay transmitters is put back to the one used for communications with the transmitter on the reception side, without fail, when a new polling comes, therefore reception of the polling frame is assuredly done.

In the foregoing, the radio reception and transmission parts 1401 and 1402 are exemplarily in a single modem 1400, and channels are concurrently switched. Here, as described in the foregoing, there no need to put those in the same modem as long as simultaneous data transmission and reception is prevented. If this is the case, channel switching for data transmission may be carried out during data reception, and channel switching for data reception during data transmission. Note herein that, the channel in each relay transmitter has to be put back to the channel used for communications with the transmitter on the reception side when the timer timeouts. In this manner, the polling frame can be assuredly received as described above.

In this embodiment, the transfer valid period information is an integer, being a unit of time taken to transmit one transmission frame. However, this is not restrictive, and may be an actual time such as a second. If this is the case, the transfer valid period is not divided by 1 but by an actual time taken to transfer one transmission frame at the time when stored in the transfer valid period control part.

Further, the number of relay transmitters in the data transmission system of this embodiment is two, that is, two-stage relay transmission is taken as an example. However, this is not restrictive and may be M-stage relay transmission (M is a natural number) where the number of transmitters is M. If this is the case, the data transmission system of this embodiment is still effective in the same level.

While the invention has been described in detail, the foregoing description is in all aspects illustrative and not restrictive. It is understood that numerous other modifications and variations can be devised without departing from the scope of the invention.

What is claimed is:

1. A relay transmission method for transmitting a data frame from a transmitter on a transmission side to a transmitter on a reception side via one or more relay transmitters, the method comprising:

transmitting a plurality of the data frames, with a frame number added to each thereof, from the transmitter on the transmission side to one or more of the relay transmitters;

sequentially transferring the data frame by one or more of the relay transmitters to the transmitter on the reception side;

transmitting, from the transmitter on the reception side to one or more of the relay transmitters, a retransmission request containing the frame number of any data frame which has not been normally received by the transmitter on the reception side, wherein the retransmission request transmitted by the transmitting of the retransmission request contains one or more frame numbers other than any frame number corresponding to the data frame normally received by the transmitter on the reception side;

sequentially transferring the retransmission request by one or more of the relay transmitters, such that each of the one or more relay transmitters deletes any frame number corresponding to the data frame stored in itself from among the frame numbers contained in the received retransmission request;

retransferring, by one or more of the relay transmitters, the data frame corresponding to the frame number deleted by said sequentially transferring the retransmission request, to the transmitter on the reception side;

retransmitting, when the retransmission request is received by the transmitter on the transmission side, the data frame corresponding to the frame number contained in the received retransmission request, from the transmitter on the transmission side to the one or more of the relay transmitters; and sequentially transferring the data frame transmitted in said retransmitting of the data frame by one or more of the relay transmitters.

2. The relay transmission method according to claim 1, wherein said sequentially transferring the data frame comprises storing, in a buffer each provided in one or more of the relay transmitters, any data frame normally received thereby and sequentially transferring the normally-received data frame by one or more of the relay transmitters to the transmitter on the reception side, and wherein said sequentially transferring the data frame comprises adding, to the data frame received by one or more of the relay transmitters, any data frame which has not been normally received by the transmitter on reception side and sequentially transferring each data frame to the transmitter on the reception side.

3. The relay transmission method according to claim 1, wherein said sequentially transferring the retransmission request further comprises:

determining whether the buffer stores every frame number included in the retransmission request received by one or more of the relay transmitters; and retransmitting, if it is determined that the buffer stores every such frame number, each data frame corresponding to frame number contained in the retransmission request to the transmitter on the reception side, and if it is determined that the buffer does not store every such frame number, deleting the frame number found in the buffer from the retransmission request for sequential transfer.

4. The relay transmission method according to claim 1, further comprising adjusting a directional antenna of one or more of the relay transmitters in a predetermined direction, wherein said sequentially transferring the data frame, said sequentially transferring the retransmission request, and said retransferring the data frame comprise:

setting, at data reception, a retention time Ta for the directional antenna to be in the predetermined direction by one or more of the relay transmitters;

adjusting the directional antenna in a direction where an adjacent transmitter on transmission side is located by one or more of the relay transmitters; and readjusting, with a lapse of the retention time Ta, the directional antenna back in the initially predetermined direction by one or more of the relay transmitters.

5. The relay transmission method according to claim 4, wherein the directional antenna is plurally provided; and wherein the directional antennas are switched there among for setting direction thereof.

6. The relay transmission method according to claim 1, further comprising:

initially selecting a predetermined frequency channel from among a plurality of frequency channels in one or more of the relay transmitters, and wherein said sequentially transferring data, said transmitting a retransmission request, and said retransferring the data frame comprise:

setting, at data reception, a retention time Ta to be in the predetermined frequency channel by one or more of the relay transmitters;

selecting a frequency channel for communicating with the transmitter on the transmission side by one or more of the relay transmitters; and selecting again, with a lapse of the retention time Ta, the predetermined initial frequency channel by one or more of the relay transmitters.

7. The relay transmission method according to claim 6, wherein said selecting a frequency channel comprises selecting a frequency channel based on which frequency channel shows a maximum throughput with the transmitter on the transmission side.

8. The relay transmission method according to claim 1, wherein the data frame and the retransmission request are each additionally provided with transfer valid period information indicating a predetermined time left for transfer, wherein said transmitting a plurality of data frames comprises:

calculating, by sequentially deducting a time taken for transmitting one data frame from the predetermined time, the time left for transfer; and adding the calculated time left for transfer as another transfer valid period information, and wherein said sequentially transferring the data frame, said transmitting a retransmission request, said sequentially transferring the retransmission request, said retransmitting the data frame, and said sequentially transferring the data frame transmitted in the retransmitting of the data frame comprise:

calculating, by sequentially deducting a time taken between data reception and transmission from the transfer valid period information included in the data frame or the retransmission request, a time left for transfer;

adding the calculated time left for transfer as another transfer valid period information; and stopping data transmission or transfer when the another transfer valid period information becomes negative.

9. The relay transmission method according to claim 8, wherein the transfer valid period information is a natural number N when the time taken for transmitting one frame is presumed to be 1.

10. The relay transmission method according to claim 8, further comprising:

initially adjusting a directional antenna of one or more of the relay transmitters in a predetermined direction, wherein said sequentially transferring the data frame, said transmitting a retransmission request, and said retransferring the data frame comprise:

setting a retention time Ta for the directional antenna to be in the predetermined direction by one or more of the relay transmitters using the transfer valid period information;

adjusting the directional antenna in a direction where the transmitter on the transmission side is located by one or more of the relay transmitters; and readjusting, with a lapse of the retention time Ta, the directional antenna back in the initially predetermined direction by one or more of the relay transmitters.

11. The relay transmission method according to claim 8, further comprising:

initially selecting a predetermined frequency channel from among a plurality of frequency channels, in one or more of the relay transmitters wherein said sequentially transferring data, said transmitting a retransmission request, and said retransferring the data frame comprise:

setting, at data reception, a retention time Ta to be in the predetermined frequency channel by one or more of the relay transmitters;

selecting a frequency channel for communicating with the transmitter on the transmission side by one or more of the relay transmitters; and selecting again, with a lapse of the retention time Ta, the predetermined initial frequency channel by one or more of the relay transmitters.

12. The relay transmission method according to claim 1, wherein said transmitting a retransmission request comprises:

comparing a predetermined time allowed for the transmitter on the transmission side to start next transmission with a maximum length of time taken to retransmit data responding to the retransmission request, and not transmitting the retransmission request when the predetermined time is smaller in value, and when the predetermined time is equal or larger, transmitting a retransmission request containing the frame number of any data frame which has not been normally received by the transmitter on the reception side to the transmitter on the transmission side.

13. The relay transmission method according to claim 12, wherein the maximum length of time taken to retransmit data responding to the retransmission request is obtained by adding 1 to the number of to-be-retransmitted frames, multiplying the value by the number of transfers and a time taken to transmit one frame, and adding the value with α (a predetermined value determined by processing capability).

14. A relay transmission system for transmitting a data frame from a transmitter on a transmission side to a transmitter on a reception side via one or more relay transmitters, said relay transmission system comprising:

a transmitter on the transmission side;

a transmitter on the receiver side; and a relay transmitter, wherein said transmitter on the transmission side comprises a data frame generation part operable to generate a retransmission data frame by adding transmission data with the frame number, a transmission part operable to transmit the transmission data frame, a reception part operable to receive a retransmission request containing the frame number of any data frame which has not been normally received by said transmitter on the reception side except for the frame number of any data frame which has not been normally received by said relay transmitter and a frame header analysis part operable to extract, if the retransmission request is received by said reception part, a frame number from the retransmission request received by said reception part, wherein said transmitter on the reception side comprises a reception part operable to receive the data frame, a frame header analysis part operable to extract the frame number from the data frame received by said reception part, a retransmission request frame generation part operable to generate a retransmission request including the frame number of the data frame not normally received by said transmitter on the reception side and a transmission part operable to transmit the retransmission request, and wherein said relay transmitter comprises a reception part operable to receive the data frame or the retransmission request containing one or more frame numbers other than any frame number corresponding to the data frame normally received by said transmitter on the reception side and a transmission part operable to transmit the data frame or the retransmission request received by said reception part, such that any frame number corresponding to data frame stored in each relay transmitter is deleted from among the frame numbers contained in the retransmission request, wherein when said transmitter on the reception side has failed to receive every data frame transmitted by said transmitter on the transmission side, said transmitter on the reception side transmits said retransmission request, and wherein said transmitter on the transmission side further comprises a retransmission control part operable to sequentially retransmit, when the retransmission request is received, the data frame corresponding to any frame number contained in received the retransmission request to said transmitter on reception side.

15. The relay transmission system according to claim 14, wherein said relay transmitter further comprises:

a retransmission frame buffer operable to store any data frame normally received by said relay transmitter, and generating a transmission data frame, in response to retransmission of data frame by said transmitter on the transmission side, a transmission data frame by adding the stored data frame to the data frame; and a retransmission request frame reconstruction part for deleting, from the retransmission request received by said relay transmitter, any frame number corresponding to the data frame stored in the retransmission frame buffer.

16. The relay transmission system according to claim 14, wherein said relay transmitter further comprises:

a directional antenna operable to transmit/receive a signal; and an antenna control part operable to control said directional antenna to direct said directional antenna in a direction where the signal goes/comes, and to readjust said directional antenna in a predetermined initial direction with a lapse of a predetermined retention time Ta.

17. The relay transmission system according to claim 14, further comprising:

a plurality of relay transmitters, wherein each of said plurality of relay transmitter further comprises:

a directional antenna operable to transmit/receive a signal;

an antenna switching part operable to selectively switch among said plurality of directional antennas; and an antenna control part operable to control said antenna switching part to direct the directional antenna in a direction where the signal goes/comes, and with a lapse of a predetermined retention time Ta, to readjust the directional antenna in the predetermined initial direction.

18. The relay transmission system according to claim 14, further comprises:

a plurality of relay transmitters, wherein one or more of said relay transmitters each further comprises a frequency channel control part operable to select a frequency channel among a plurality of frequency channels, and with a lapse of a predetermined retention time Ta set to be in the selected frequency channel, to reselect the same frequency channel, and wherein said transmission part and said reception part are further operable to transmit/receive a signal in the frequency channel selected by said frequency channel control part.

19. The relay transmission system according to claim 14, further comprising:

a plurality of relay transmitters, wherein said transmitter on the transmission side further comprises a transfer valid period control part operable to calculate a time left for transfer, as another transfer valid period information, by sequentially deducting a time taken for transmitting one data frame from transfer valid period information indicating a predetermined time allowed for the transfer, and to stop transmission when the transfer valid period information becomes negative, and a transfer valid period addition part operable to add the transfer valid period information to the data frame, wherein said transmitter on the reception side comprises a transfer valid period control part operable to calculate a time left for transfer, as another transfer valid period information, by sequentially deducting a time taken for transmitting one data frame from transfer valid period information indicating a predetermined time allowed for the transfer, and to stop transmission when the transfer valid period information becomes negative, and a transfer valid period addition part operable to add the transfer valid period information to the retransmission request, and wherein one or more of said relay transmitters each further comprises a transfer valid period control part operable to calculate a time left for transfer, as another transfer valid period information, by sequentially deducting a time taken between data reception and transmission from the transfer valid period information included in the data frame or the retransmission request, and to stop transmission when the transfer valid period information becomes negative, and a transfer valid period addition part operable to add the transfer valid period information to the data frame or the retransmission request.

20. The relay transmission system according to claim 19, wherein said transfer valid period information is a natural number N when the time taken for transmitting one frame is presumed to be 1.

21. The relay transmission system according to claim 19, further comprising:

a plurality of relay transmitters, wherein one or more said relay transmitters each further comprises a directional antenna operable to transmit/receive a signal and an antenna control part operable to control said directional antenna to direct said directional antenna in a direction where the signal goes/comes, and to readjust the directional antenna in a predetermined initial direction with a lapse of a predetermined retention time Ta determined by using the transfer valid period information.

22. The relay transmission system according to claim 19, further comprising:

a plurality of relay transmitters, wherein one or more said relay transmitters each further comprises a frequency channel control part operable to select a frequency channel among a plurality of frequency channels to receive/transmit a signal, and with a lapse of a predetermined retention time Ta determined using the transfer valid period information, to reselect the same frequency channel, and wherein said transmission part and said reception part are operable transmit/receive a signal in the frequency channel selected by said frequency channel control part.

23. A transmitter on a transmission side operable to transmit a data frame to a transmitter on a reception side via one or more relay transmitters, said transmitter on a transmission side comprising:

a data frame generation part operable to generate a retransmission data frame by adding transmission data with a frame number;

a transmission part operable to transmit the transmission data frame;

a reception part operable to receive a retransmission request containing the frame number of any data frame which has not been normally received by the transmitter on the reception side, from which the frame number of any data frame which has been normally received by one or more of the relay transmitters is deleted; and a frame header analysis part operable to extract, if the retransmission request is received by said reception part, a frame number from the retransmission request received by said reception part, wherein when the transmitter on the reception side has failed to receive every data frame transmitted, the transmitter on the reception side transmits the retransmission request, wherein the retransmission request contains one or more frame numbers other than any frame number corresponding to the data frame normally received by the transmitter on the reception side or any frame number corresponding to the data frame stored in one or more of the relay transmitters, and wherein, said transmitter on the transmission side further comprises a retransmission control part operable to sequentially retransmit the data frame corresponding to any frame number contained in received retransmission request to the transmitter on the reception side.

24. The transmitter on the transmission side according to claim 23, further comprising:

a transfer valid period control part operable to calculate a time left for transfer, as another transfer valid period information, by sequentially deducting a time taken for transmitting one data frame from transfer valid period information indicating a predetermined time allowed for the transfer, and to stop transmission when the transfer valid period information becomes negative; and a transfer valid period addition part operable to add the transfer valid period information to the data frame.

25. A transmitter on a reception side for receiving a data frame from a transmitter on a transmission side via one or more relay transmitters, said transmitter on a reception side comprising:

a reception part operable to receive the data frame;

a frame header analysis part operable to extract the frame number from the data frame received by said reception part;

a retransmission request frame generation part operable to generate a retransmission request including the frame number corresponding to the data frame not normally received by said transmitter on the reception side;

a transfer valid period control part operable to calculate a time left for transfer, as another transfer valid period information, by sequentially deducting a time taken for transmitting one data frame from transfer valid period information indicating a predetermined time allowed for the transfer, and to stop transmission when the transfer valid period information becomes negative;

a transfer valid period addition part operable to add the transfer valid period addition information to the retransmission request; and a transmission part operable to transmit the retransmission request, wherein said transmitter on reception side further comprises a retransmission control part, operable to, when failing to receive every data frame transmitted from the transmitter on the transmission side, retransmit the retransmission request.

26. A relay transmitter for transmitting a data frame from a transmitter on a transmission side to a transmitter on a reception side, said relay transmitter comprising:

a reception part operable to receive the data frame or a retransmission request; and a transmission part operable to transmit the data frame or the retransmission request received by said reception part, wherein the retransmission request transmitted by said transmission part contains one or more frame numbers other than any frame number corresponding to the data frame normally received by the transmitter on the reception side or any frame number corresponding to data frame stored in said relay transmitter, wherein when the transmitter on the reception side has failed to receive every data frame transmitted by the transmitter on the transmission side, the transmitter on the reception side transmits the retransmission request, and when the retransmission request is received by the transmitter on the transmission side, said reception part receives each data frame corresponding to any frame number contained in received the retransmission request, and wherein said relay transmitter further comprises a relay control part operable to add, to the received data frame, any data frame which is stored in a buffer of said relay transmitter and which has not been normally received by the transmitter on the reception side.

27. The relay transmitter according to claim 26, further comprising:

a transfer valid period control part operable to calculate a time left for transfer, as another transfer valid period information, by sequentially deducting a time taken between data reception and transmission from the transfer valid period information included in the data frame or the retransmission request, and to stop transmission when the transfer valid period information becomes negative, and a transfer valid period addition part operable to add the transfer valid period information to the data frame or the retransmission request.

\* \* \* \* \*